US007567430B2

(12) United States Patent
Ewing et al.

(10) Patent No.: US 7,567,430 B2
(45) **Date of Patent: *Jul. 28, 2009**

(54) ELECTRICAL CIRCUIT APPARATUS WITH FUSE ACCESS SECTION

(75) Inventors: Carrel W. Ewing, Reno, NV (US); Andrew J. Cleveland, Reno, NV (US)

(73) Assignee: Server Technology, Inc., Reno, NV (US)

( * ) Notice: Subject to any disclaimer, the term of this patent is extended or adjusted under 35 U.S.C. 154(b) by 165 days.

This patent is subject to a terminal disclaimer.

(21) Appl. No.: 11/529,960

(22) Filed: Sep. 29, 2006

(65) Prior Publication Data

US 2007/0025066 A1 Feb. 1, 2007

Related U.S. Application Data

(63) Continuation of application No. 10/847,724, filed on May 17, 2004, now Pat. No. 7,116,550.

(60) Provisional application No. 60/516,671, filed on Oct. 30, 2003, provisional application No. 60/525,780, filed on Nov. 28, 2003.

(51) Int. Cl.
*H02B 1/26* (2006.01)

(52) U.S. Cl. ......................... 361/623; 174/50; 337/186; 337/189

(58) Field of Classification Search .................. 361/623
See application file for complete search history.

(56) References Cited

U.S. PATENT DOCUMENTS

| | | | | |
|---|---|---|---|---|
| 5,821,636 | A | 10/1998 | Baker et al. | |
| 6,068,404 | A * | 5/2000 | Edelmann et al. | 384/45 |
| 6,608,406 | B2 * | 8/2003 | Bersiek | 307/125 |
| 6,667,681 | B1 | 12/2003 | Meiners et al. | |
| 6,826,036 | B2 | 11/2004 | Pereira | |
| 6,882,530 | B2 | 4/2005 | Cyphers et al. | |
| 6,967,283 | B2 | 11/2005 | Rasmussen et al. | |
| 7,116,550 | B2 * | 10/2006 | Ewing et al. | 361/623 |
| 7,196,900 | B2 * | 3/2007 | Ewing et al. | 361/642 |
| 7,199,491 | B2 * | 4/2007 | Novinsky et al. | 307/328 |
| 7,268,998 | B2 * | 9/2007 | Ewing et al. | 361/622 |
| 7,400,493 | B2 * | 7/2008 | Ewing et al. | 361/623 |

* cited by examiner

*Primary Examiner*—Gregory D Thompson
(74) *Attorney, Agent, or Firm*—Holland & Hart, LLP

(57) ABSTRACT

An electrical apparatus has an elongated housing with fuses located therein. Windows are provided in the housing to close apertures in registration with fuse locations to allow access to fuses by removing the window. Fuses may be carried on a circuit card removably engageable with a terminal block secured to a wall within the housing. A fuse compartment cover is removably secured to the housing. The window comprises a fuse condition indicator to allow determination of the condition of the fuse (i.e. blown or not blown) without having to open the window. Additionally, powered indicators such as LEDs visible through the windows may indicate the state of fuses. The housing may comprise a power distribution unit and may be rack mounted or mounted to a wall of a rack assembly. The windows are located on the housing to be removable free of engagement with the assembly. In various embodiments, the windows may be included in a different one of the walls so that the windows will be unobstructed when the housing is in one of a number of orientations. The fuse compartment may be opened without removing the unit from the rack.

32 Claims, 19 Drawing Sheets

ELECTRICAL CIRCUIT APPARATUS WITH FUSE ACCESS SECTION

CROSS REFERENCE TO RELATED APPLICATIONS

This application is a continuation of U.S. patent application Ser. No. 10/847,724, filed May 17, 2004 now U.S. Pat. No. 7,116,550, which claims the benefit of U.S. Provisional Application No. 60/516,671, filed Oct. 30, 2003, and U.S. Provisional Application No. 60/525,780, filed Nov. 28, 2003. These applications are incorporated herein by reference.

FIELD

The present invention relates to fused electrical apparatus having a housing allowing access to a fuse compartment and more particularly, in one preferred form, to a rack associated or rack-mountable power distribution apparatus having accessible fuse compartments.

BACKGROUND

Fuses are widely used in electrical equipment connected in series to protect conductors and components from damage due to high current levels ("overcurrent"). Typically, a fuse consists of a fusible link installed in a circuit. When the current in the circuit reaches a predetermined maximum level provided by the fusible link, the fusible link melts or burns (i.e., blows). This breaks the circuit connection provided by the link and terminates the flow of overcurrent in the circuit.

Once the condition causing the overcurrent is corrected, the fuse must be replaced in order to allow current to flow through the fuse and its associated circuitry. Many forms of fuse mounting apparatus have been developed for this purpose.

In many forms of consumer electronics, for example, a cylindrical fuse holder penetrates the electronic unit housing. A removable fuse holder cap extends outwardly from the housing (and unshielded by the housing as well). A tubular fuse is disposed in the cylindrical interior fuse passage in the fuse holder. Electrical contacts at each end of the fuse abut mating contacts at opposing ends of the fuse passage. When the removable cap is removed, the fuse may be readily removed from the cylindrical fuse passage, inspected to determine if it is blown, and replaced if necessary.

A common fuse apparatus in automotive applications provides a fuse block holding a plurality of U-shaped fuses in one location for a number of circuits. In this type of fuse apparatus, the circuitry protected by each fuse may or may not be protected by enclosures, such as the engine compartment or a dash board. This centralized fuse location, however, simplifies the task of replacing a fuse since a user does not have to gain access to the protected circuitry. Although this centralized fuse apparatus provides more convenient access to fuses in the apparatus, the user must still test or remove and observe a given fuse to determine if it is blown and the cause of a problem in associated circuitry.

In many other applications, these types of prior art fusing and fuse-access schemes are unsuitable. In many instances, the size or current capacity of the fuse does not lend itself to these types of fuse arrangements. In many of these types of applications, the fuses are mounted on a circuit board within and enclosed by the electronic equipment housing, so that the fuses may be both well shielded and located relatively adjacent to or within the circuit(s) they protect within the housing.

These types of internally mounted fuses (with one or more fuses mounted within the confines of a closed housing) are not easily inspected or accessed. In order to do so, the housing of the unit in which the fuses are mounted must be fully opened by removing a side or top or bottom panel in the housing.

In many cases, the unit must first be removed from an equipment rack in order to be able to open the housing in this fashion and obtain access to the interior of the housing. Then, after inspecting one or more fuses mounted in the housing, the housing must be reassembled and re-mounted in the rack.

Often, an internally fused electronic apparatus will have a warranty provision voiding the warranty if the user opens the equipment housing. A user of this type of equipment therefore cannot even inspect a fuse much less gain access to it for removal or replacement without voiding the warranty. Instead, the user must typically obtain a return material authorization from the vendor, ship the unit to the vendor's repair facility for service, and then have the repair facility again ship the unit back to the user—all simply to inspect, and if necessary, replace one or more blown fuses in the unit.

These types of fuse access problems have long been quite predominant in the case of rack mounted systems in which system components are connected to a power distribution unit (PDU) that supplies power to the components in the rack. PDU-supplied rack mounted systems are common in broadcast network head ends and reception/re-broadcast stations, telecommunications central offices, and data centers for local and wide area networks. Components of rack systems can include servers, routers, satellite receivers, amplifiers, codecs (coder/decoders), and cooling equipment.

In these types of environments, the PDU often has a number of power output receptacles mounted in a rectangular housing. The rectangular housing can be mounted adjacent an electronic equipment rack structure (typically outside the confines the rack such as the outside face of a vertical support in the rack), and electronic components in the rack have power supply cords plugged into the power output receptacles in the PDU.

The PDU typically has a number of fuses, each providing overcurrent protection to one or more power output receptacles and electronic equipment plugged into the receptacles. Most commonly, the fuses in this type of PDU are mounted in fuse holders mounted directly to circuit boards within the PDU housing. The fuses can only be inspected and accessed by first unplugging the associated electronic equipment (forcing the equipment to shut down), removing the PDU from the rack if mounted on it, and then opening the PDU housing by removing a top or bottom cover. Removal of the printed circuit board may even be necessary. After inspection and replacement of blown fuses if necessary, the entire process is reversed in order to return the PDU and associated equipment to operational status.

This situation has long prevailed notwithstanding the substantial downtime, problems, costs, and delays that follow from having fuses mounted in this fashion within the PDU and other electronic equipment, particularly heavy duty industrial PDU's and electronic equipment manufactured in compliance with standards requiring particularly low levels of radio frequency or other emissions from the equipment. These problems are particularly problematic in industrial polyphase power supply systems, in which fuses may blow more frequently.

The applicants believe that conventional PDU's have long presented other problems as well. For example, as noted above prior art PDU's are often mounted outside the confines of the rack housing by securing the PDU to the outside surface of a portion of the rack. Wiring between the PDU and associated electronic equipment is therefore exposed outside the confines of the rack and subject to accidental and potentially interrupting or damaging contact with other structures or personnel passing by the rack and associated PDU. When such contact occurs, which is does in practice, electronic equipment can be accidentally shut down or even damaged, and the time required to locate and resolve the problem can be substantial and costly for the operator and its customers or other users.

SUMMARY

Briefly stated, one aspect of the present invention provides a removable fuse access section adjacent a fuse mount in an electronic equipment housing. The fuse access section may provide access to a fuse mounted in the fuse mount by removal or other movement of the fuse access panel with respect to the housing.

In one embodiment, one or more fuses may be carried on a printed circuit board or on a circuit card removably engageable with a circuit board. The fuse access section is relatively smaller than a side of the housing in which it is mounted and may be removed or moved with respect to the balance of the housing without need for removing the side or other relatively larger cover of the housing.

In a particularly preferred embodiment, a fuse access panel in the housing preferably comprises a relatively small portion removably or movably mounted in a relatively larger side of the housing, and the fuse mount is adjacent the fuse access panel within the confines of the housing. The fuse access panel is preferably planar and made of polycarbonate resin.

In a further embodiment, a fuse condition indicator is provided. In one embodiment, the fuse condition indicator indicates the condition of the fuse (i.e. blown or not blown) without having to open the fuse access panel or section.

In one particularly preferred form, the fuse condition indicator includes a transparent fuse compartment cover, providing a fuse access section. A user may look through the cover to inspect a fuse mounted in an interior fuse mount.

In another embodiment, an indicator element is provided which assumes a state corresponding with the state of the fuse. The indicator element may comprise, for example, a light emitting diode (LED) that is OFF when an associated fuse is blown and ON when the fuse is capable of conducting current.

In other embodiments, the housing may comprise a power distribution unit (PDU). The PDU may include any of a number of features described in this or the Detailed Description section infra. In combination with an associated or co-integrated equipment rack, the PDU/rack can most preferably provide convenient access to fuses within the PDU/rack while, if desired, more safely and securely maintaining electronic equipment wiring adjacent or within the confines of the rack. In various embodiments, the windows may be included in a different one of the walls of the housing so that the windows will be unobstructed when the housing is in one of the number of various orientations.

It is to be understood that this is a Brief Summary of various aspects of the invention and preferred embodiments. Other aspects of the invention will become apparent as this specification proceeds. This Brief Summary is therefore neither exhaustive nor determinative of the scope of the present invention, and given embodiments need not include all the features recited herein nor solve all issues or problems with the prior art noted above.

SUMMARY OF THE DRAWINGS

The preferred embodiments of the present disclosure are shown in the accompanying drawings, in which.

DETAILED DESCRIPTION OF THE PREFERRED EMBODIMENTS

Figure 1:
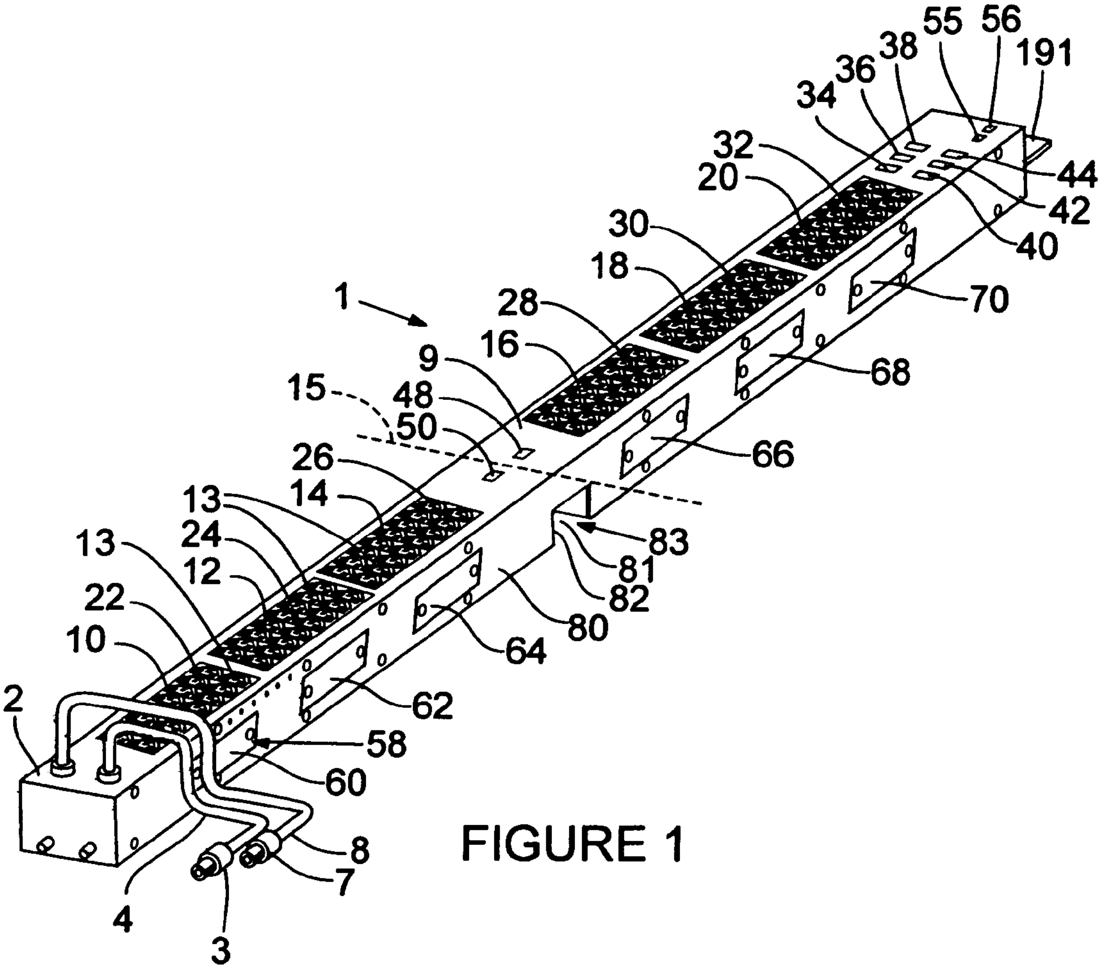
FIG. 1 is an axonometric view of a housing constructed in accordance with one embodiment of the present invention.
Figure 20:
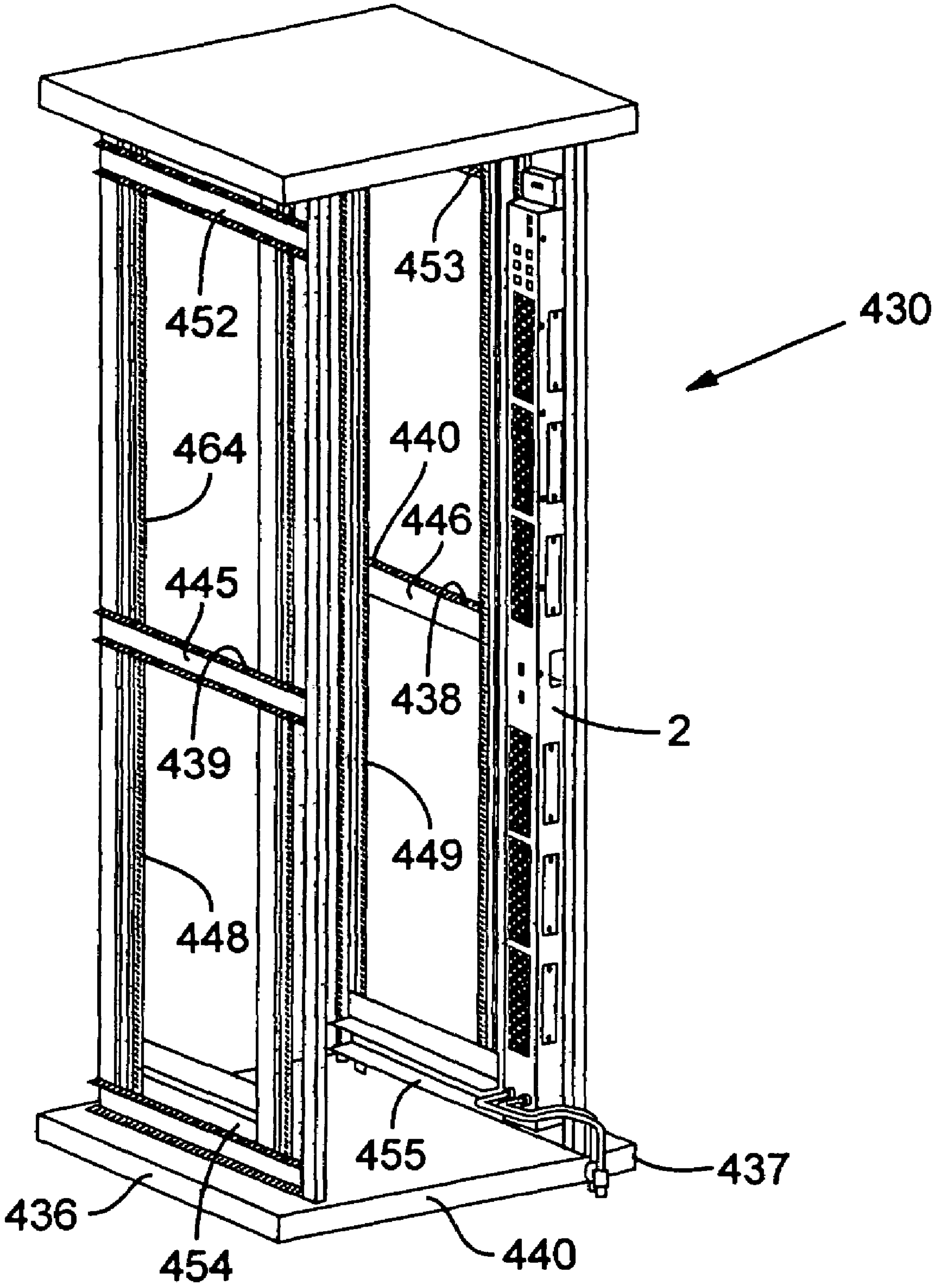
FIG. 20 is a perspective view of the apparatus of FIG. 1 mounted in a rack.
Figure 21:
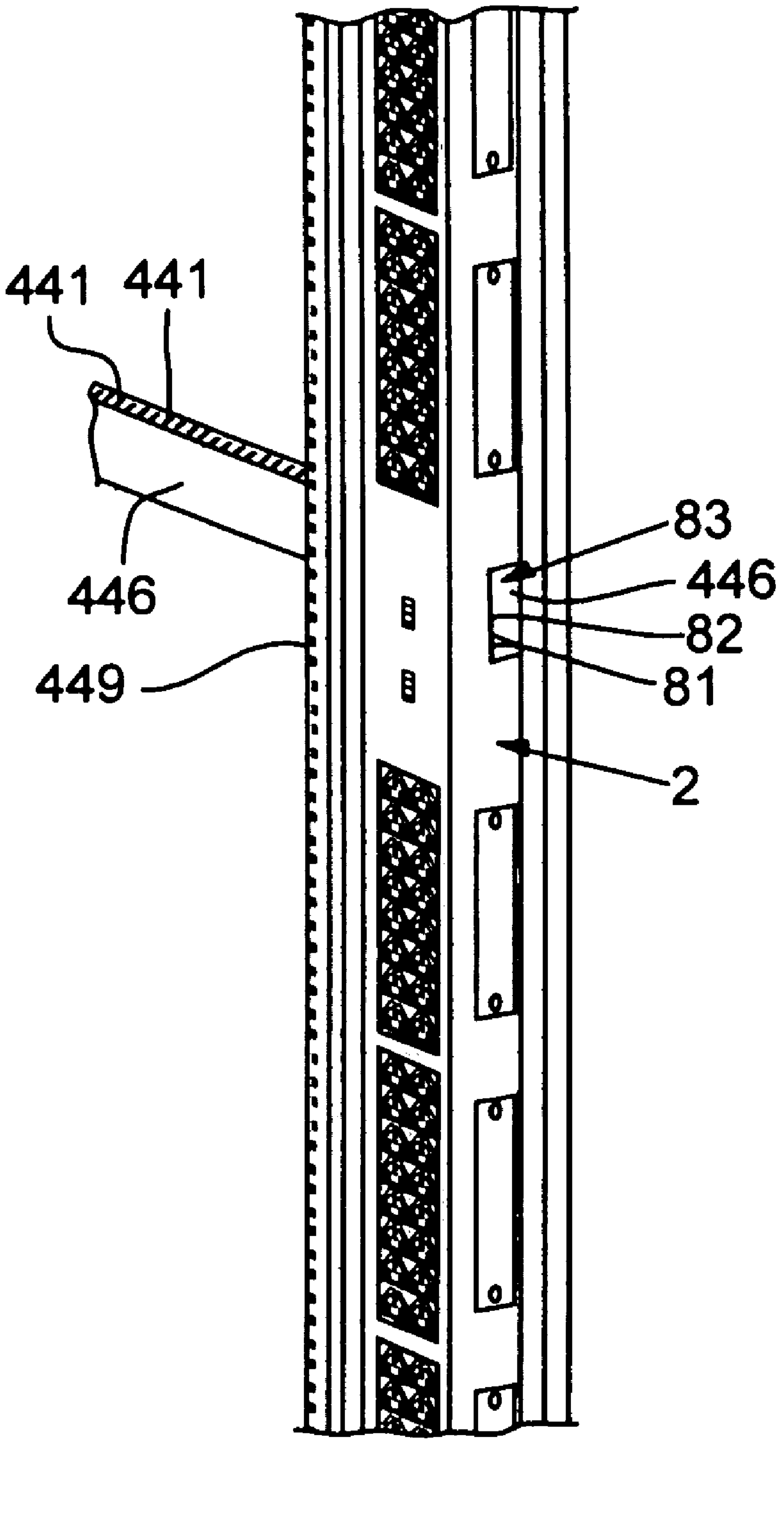
FIG. 21 is a partial detailed view of FIG. 20.
Figure 22:
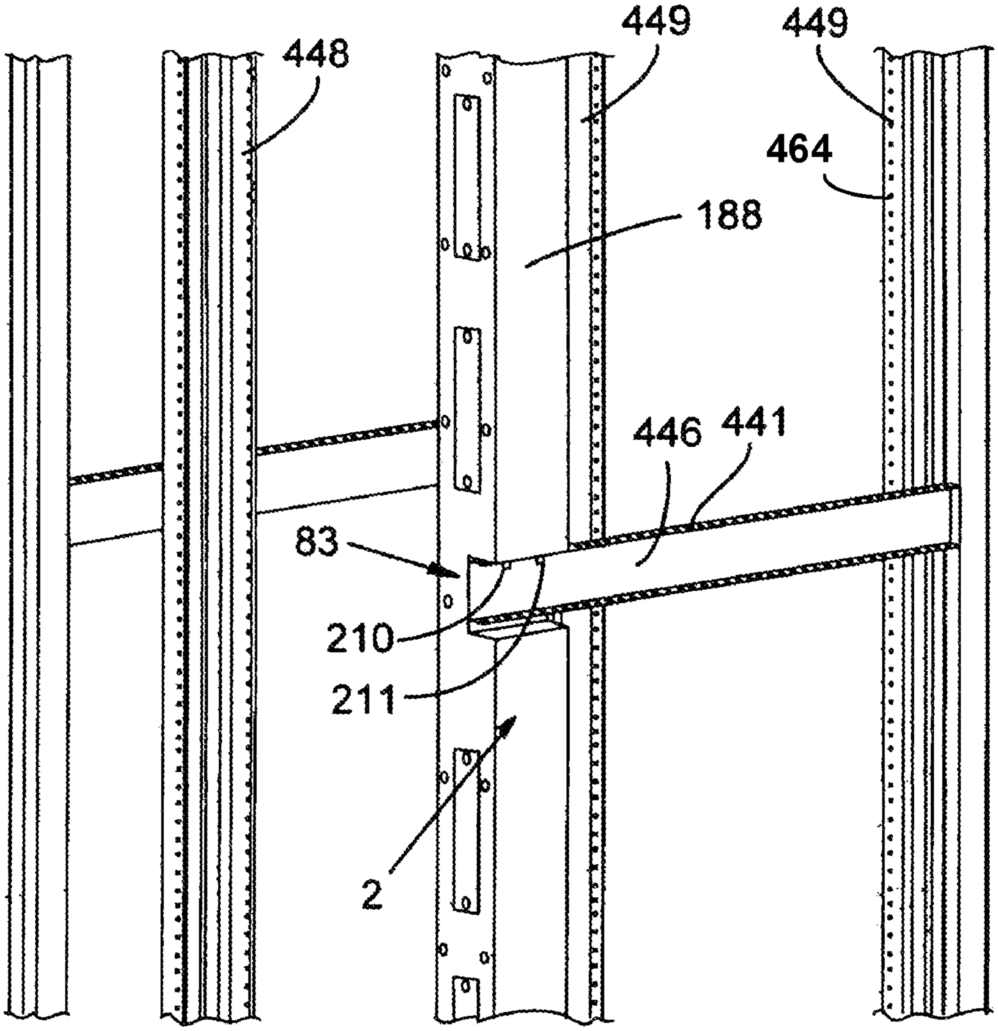
FIG. 22 is a partial detailed view of FIG. 20 illustrating an opposite side of the power distribution apparatus.

With reference now to FIG. 1, an electrical power distribution unit (PDU) I is adapted to receive one or more polyphase power inputs and to provide a plurality of single-phase power outputs. In the embodiment of FIGS. 20-22, the PDU 1 may be included in a rack mounted data center. Many other different forms of apparatus other than a PDU may be provided in accordance with the present invention. The context of a PDU is provided as a preferred example.

It should be noted that this specification employs spatially orienting terms to explain relative locations. In order to provide orientation with respect to the housing 2, the vertical dimension is also referred to as the longitudinal dimension. The horizontal dimension across the front panel 9 is the lateral dimension. The third dimension perpendicular to the surface of the front panel 9 is the transverse dimension.

With continuing reference to FIG. 1, a first three-phase plug 3 is connected to a three-phase alternating current source (not shown). A first power cord 4 couples power to the housing 2. A second three-phase plug 7 may be connected to the three-phase alternating current source. A second power cord 8 couples power to the housing 2 from the second plug 7. The three phases provided through the first plug 3 are arbitrarily referred to as phases A, B, and C. The three phases provided through the second plug 7 are arbitrarily referred to as X, Y, and Z.

Figure 2:
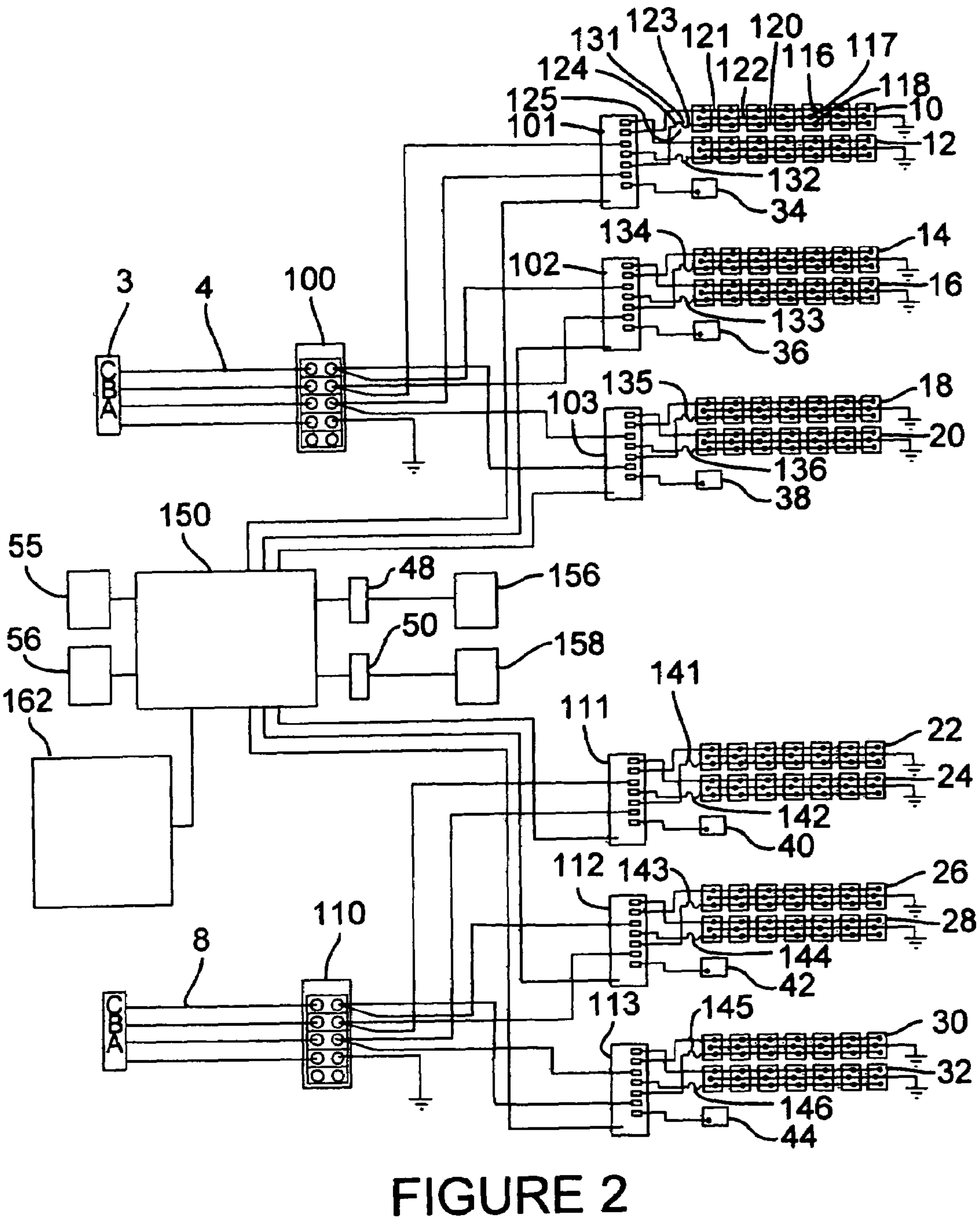
FIG. 2 is a schematic illustration of the apparatus of FIG. 1.

With reference now to FIG. 2, circuitry in the housing 2 divides the three phase alternating current into a plurality of single phase inputs to components plugged in to the PDU 1. At a front panel 9 of the housing 2, single phase voltage is provided at outlets arranged in banks further described below.

The present embodiment utilizes separate first and second plugs 3 and 7 so that multiple power inputs can be provided, such as for a data center, telecommunications central office, or broadcast network equipment rack. Alternatively, a single power input could be provided.

The elongated dimension of the housing 2 may be referred to as the vertical direction because, when the housing 2 is mounted in a rack assembly, the front panel 9 is disposed in a vertical plane. First and second power receptacle banks 10, 12 extend vertically adjacent a lower end of the housing 2. Each bank has seven power receptacles 13.

Each receptacle 13 may include a standard 120 volt grounded outlet. Third and fourth power receptacle banks 14, 16 extend vertically above the first and second power receptacle banks 10, 12 and may be on opposite sides of a vertical centerline 15 of the front panel 9. Fifth and sixth power receptacle banks 18, 20 extend successively vertically above the third and fourth power receptacle banks 14, 16. Seventh and eighth power receptacle banks 22, 24 are vertically aligned and horizontally adjacent to the banks 10, 12 respectively. Ninth and tenth power receptacle banks 26, 28 are vertically aligned and horizontally adjacent to the third and fourth banks 14, 16 respectively. Similarly, eleventh and twelfth power receptacle banks 30, 32 are vertically aligned with and horizontally adjacent to the fifth and sixth power receptacle banks 18, 20.

Other numbers of power receptacle banks could be provided and each power receptacle bank could include a different number of receptacles 13. Other phase connections could be made. The various banks of receptacles may be connected to different ones of the phases A, B and C and X, Y and Z. In the present embodiment, the banks of receptacles are connected as described with reference to FIG. 2 below.

In a preferred form, the electrical apparatus includes displays 34, 36, 38, 40, 42, 44 for respectively displaying the currents drawn in each of phases A through C and X through Z. The displays may be located on the front panel 9 between the power receptacle banks 20 and 32 and an upper, or longitudinally distal, end of the housing 2. A first set of three displays 34, 36, 38 are aligned in a first vertical column, and a second set of three displays 40, 42, 44 are aligned in a second vertical column laterally adjacent to the first vertical column of the first set of displays 34, 36, 38. Preferably, each one among the displays 34-44 indicates RMS current levels for a particular phase of power provided by the PDU 1 (in this case, A, B, C, X, Y, and Z respectively).

The PDU 1 may be a power distribution apparatus of the type providing intelligent power distribution, remote power management, power monitoring, and environmental monitoring. An example of such a system is the Dual-Feed Power Tower XL manufactured by Server Technology, Inc. of Reno, Nev. For this type of power distribution unit, further interface ports, described below, are provided in the front panel 9.

Ever increasing densities of vertically racked servers, such as in the embodiment of FIGS. 20-22 below, conserve valuable floor space, but the resulting power consumption and heat dissipation create new concerns for data center managers. Once temperature increases above a particular threshold, data system server failure rates increase 2-3 percent for every one degree rise in temperature. First and second environmental monitoring ports 48, 50 are therefore provided in the longitudinal center of the front panel 9 to receive input signals indicative of temperature and humidity, respectively, from measurement apparatus illustrated in FIG. 2 and further described below.

Communications interfaces are provided by first and second communications ports 55, 56 at the upper end of the front panel 9. The first and second ports 55, 56 may include RJ-45 connectors. The first communications port 55 may be a serial, RS-232 port. The second communications port 56 may be an Ethernet port.

In the power distribution unit of FIG. 1, each bank of receptacles is "fused." In other words, each of the power receptacle banks 10, 12, 14, 16 18, 20, 22, 24, 26, 28, 30 are each protected by a fuse further described below. In this embodiment, the fuses are made accessible without the need to disassemble the housing 2, e.g., as by removing the front panel 9 from the housing 2. Further, the PDU 1 includes fuse state indicators 58 so that the state of the fuse may be determined by visual inspection. In the embodiment of FIG. 1, six fuse state indicators 58 are provided each having a window through which two fuses are visible. Other numbers of fuses can be mounted behind each window 60-70.

In the present example, removable window 60 provides not only access to fuses within the housing 2 but also an indication of the states of fuses for the first and sixth banks 10, 20. Similarly, planar windows 62, 64, 66, 68, 70 are indicators for fuses associated with banks 12 and 24, 14 and 26, 16 and 28, 18 and 30, and 20 and 32, respectively. The windows 60-70 are removable in a manner described below to provide access to fuses. Preferably, the windows 60-70 are in longitudinal alignment with the power receptacle banks for which they are indicators. The windows 60-70 may be made of Lucite, polycarbonate resin, or another transparent material.

Preferably, the windows 60-70 are mounted in a first side wall 80 of the housing 2 perpendicular to, and within a first transverse side of, the front panel 9. The first side wall 80 is located laterally adjacent the fuses mounted within the housing 2. As a result, the fuses are observable through the fuse windows 60-70.

Fuses of the type used in power distribution apparatus change in physical appearance, as by taking on a burnt look for example, when they blow. The fuse status is indicated by viewing through one of the windows 60-70.

In alternative embodiments discussed below, the indicator of the fuse's status may include a device that actively indicates, such as a light emitting diode (LED). The LED may be on or off in correspondence with the state of the fuse, providing an indicator of fuse condition to someone who might view the housing 2 at a substantial distance from it.

The housing 2 also includes a rack mounting section 81. As can be seen in FIG. 1, the rack mounting section 81 includes a mounting contour 82 included in a detent 83 in the housing 2. The detent 83 may include further components described below for securing the housing 2 in a given spatial relationship in a rack. The mounting contour 82 facilitates mounting of the housing 2 in a conventional electronic equipment rack assembly, such as RETMA rack. As further described with respect to the embodiment of FIG. 20 below, the detent 83 allows the housing 2 to be removably positioned or mounted vertically on the rearward portion of a horizontal mounting rail in an equipment rack assembly. In this fashion, the housing 2 may be mounted substantially or even entirely within the internal confines of the RETMA rack, reducing wiring and equipment access space consumption within the RETMA rack, and allowing wiring to and from the housing 2 and associated electronic equipment in the rack to be easily, safely, and securely maintained within the confines of the rack.

The mounting contour 82 results from a rectangular cutout in the plane of the first side wall 80 having one side in line with a rear wall (FIG. 5) of the housing 2. The contour 82 thus provides a U-shaped detent or mounting channel in the housing 2.

FIG. 2 is a schematic illustration of the PDU 1. In FIG. 2, the same reference numerals are used to denote items corresponding to those in FIG. 1. The first power cord 4 is connected to a first main terminal block 100 which in turn is connected to supply power to first, second, and third bank supply terminal blocks 101, 102, 103. Similarly, the second power cord 8 is connected to a second main terminal block 110, which is connected to supply power to fourth, fifth, and sixth bank supply terminal blocks 111, 112, 113.

The first bank supply terminal block 101 couples phases A and B to the first and second power receptacle banks 10, 12 respectively. The second bank supply terminal block 102 couples phases B and C to third and fourth power receptacle banks 14, 16 respectively. The third bank supply terminal block 103 couples phases C and A to fifth and sixth power receptacle banks 18, 20 respectively.

Similarly, the fourth bank supply terminal block 111 couples phases X and Y to seventh and eighth power receptacle banks 22, 24 respectively. The fifth bank supply terminal block 112 couples phases Y and Z to ninth and tenth power receptacle banks 26, 28 respectively. The sixth bank supply terminal block 113 couples phases Z and X to eleventh and twelfth power receptacle banks 30, 32 respectively.

As denoted in the diagram of the first power receptacle bank 10, which is illustrative of the wiring and fusing of all power receptacle banks identified above, each receptacle 13 has a first terminal 118 connected to a phase input line 120, a second terminal 116 connected to a neutral line 121 and a third terminal 117 connected to a grounded line 122. The representative first power receptacle bank 10 is fused in the line 120. Each line 120 includes fuse mount terminals 123, 124 connected to opposite ends of a fuse. One or more pairs of first and second fuse mount terminals 123, 124, respectively, may be included in a fuse holder 125. The first and second fuse mount terminals 123, 124 may consist of lugs soldered to fuses, fuse clips or other fuse mounting structures available or known in the art.

Fuses 131, 132 are connected in lines 120 between the first bank supply terminal block 101 and the first and second power receptacle banks 10, 12, respectively. Fuses 133, 134 are connected in lines 120 between the second bank supply terminal block 102 and the third and fourth power receptacle banks 14, 16, respectively. Fuses 135, 136 are connected in lines 120 between the third bank supply terminal block 103 and the fifth and sixth power receptacle banks 18, 20, respectively.

Similarly, fuses 141, 142 are connected in lines 120 between the fourth bank supply terminal block 111 and the seventh and eighth power receptacle banks 22, 24, respectively. Fuses 143 and 144 are connected in lines 120 between the fifth bank supply terminal block 112 and the ninth and tenth power receptacle banks 26 and 28, respectively. Fuses 145 and 146 are connected in lines 120 between the sixth bank supply terminal block 113 and the eleventh and twelfth power receptacle banks 30 and 32, respectively.

A control circuit 150 is coupled to each of the first through third bank supply terminal blocks 101-103 and each of the fourth through sixth bank supply terminal blocks 111-113. The control circuit 150 may provide the intelligent power distribution, remote power management, power monitoring and environmental monitoring as provided in the above-cited Dual-Feed Power Tower XL system. The structure and operation of the control circuit 150 do not form part of the present invention although the control circuit 150 has novel and unexpected interactions in the context of the present embodiment. The control circuit 150 interfaces with the first, second, and third bank supply terminal blocks 101, 102, 103 to provide RMS current signals coupled to the associated first, second, and third RMS current level displays 34, 36, 38 respectively. Similarly, the control circuit 150 is coupled by the fourth, fifth, and sixth bank supply terminal blocks 111, 112, 113 to provide current signals to the associated fourth, fifth, and sixth RMS current level displays 40, 42, 44 respectively.

The first through sixth bank supply terminal blocks 101, 102, 103, 111, 112, and 113 are also coupled to provide inputs to the control circuit 150. Calculation of an RMS current signal is done in a known manner. For example, phase current measurement is provided in the above-cited Dual-Feed Power Tower XL system.

The first and second environmental monitoring ports 48, 50 are connected to the control circuit 150 and receive inputs from a temperature sensor 156 and a moisture sensor 158 respectively. The above-cited Dual-Feed Power Tower XL system also provides for IP (internet protocol) telephony and IPT-DSP (internet protocol telephony digital signal processing). The control circuit 150 is connected to the first and second communications ports 55, 56 to communicate the status of the system. A condition-sensing circuit 162 is coupled to the control circuit 150 to report on such conditions as an open circuit in series with one of the bank supply terminal blocks 101-103 or 111-113.

The housing 2 may be provided in a horizontal unit for mounting to rack rails. Alternatively, as in the present example, the housing 2 may be provided in a configuration for mounting to a wall in a rack unit (further illustrated below in FIGS. 20-23) to provide for convenient location with respect to power cords of rack mounted equipment and to avoid taking up vertical space within the confines of rack rails.

Figure 3:
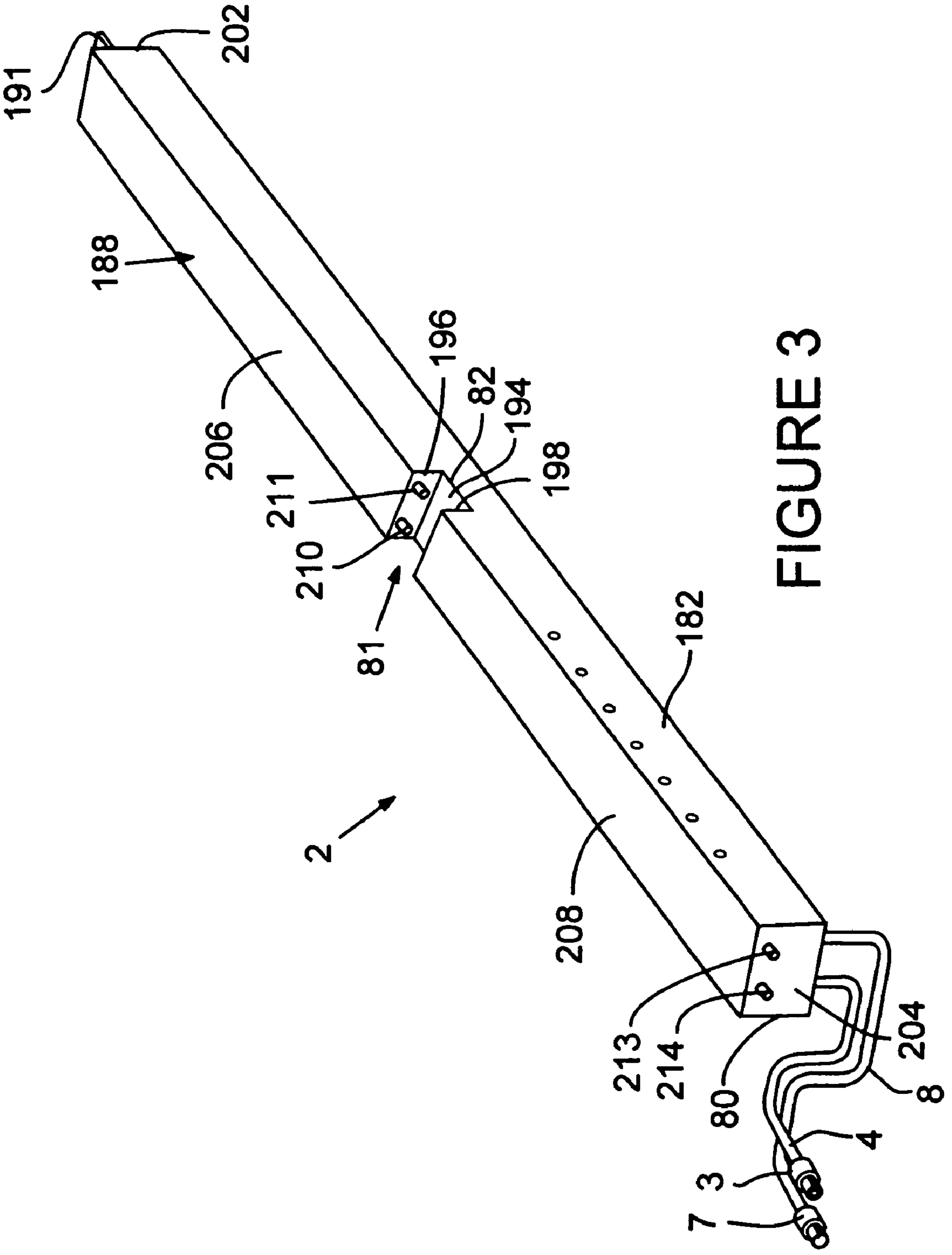
FIG. 3 is an axonometric view of a back side of the apparatus of FIG. 1.
Figure 4:
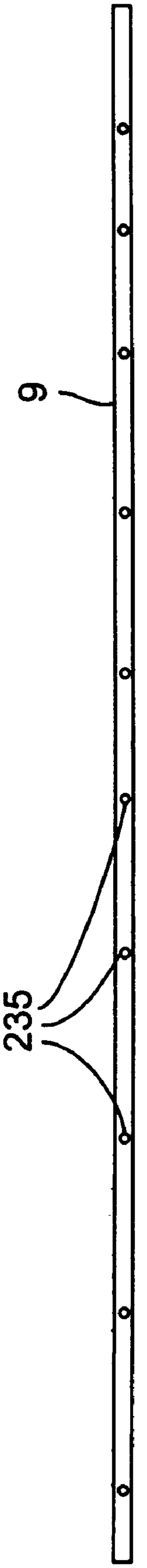
FIG. 4 is a side view of the top panel of the housing of FIG. 1.

The structure of the housing 2 of FIG. 1 is further understood with reference to FIGS. 3-8. As illustrated in FIG. 3, a second side wall 182 is substantially parallel to the first side wall 80 (FIG. 1). At a "front"end, a second side wall 182 (also illustrated in FIG. 8) is joined to the front panel 9 (also illustrated in FIG. 4) parallel to the first side wall 80 at the opposite lateral side of the front panel 9. The second side wall 182 also includes the mounting contour 82, as does the first side wall 80 (FIG. 1). A back panel 188 (also illustrated in FIGS. 3, 6 and 7) is joined to the first side wall 80 and second sidewall 182. Fasteners, e.g. metal screws, project through apertures (e.g., apertures 237, 247 shown in FIGS. 5 and 6) discussed below with respect to FIGS. 4-8 to join the front panel 9, back panel 188 and the first and second side walls 80 and 182 to close the housing 2. An end mounting bracket 191 may be affixed to the longitudinally distal end of the housing 2 to provide for mounting in a rack unit. Structure of the end mounting bracket 191 is further described below.

The rack mating section 81 of the housing 2 is formed in a portion of the back panel 188. The rack mating section 81 includes a central indented (i.e., closer to the front panel 9 than other portions of the back panel 188) surface 194. The central indented surface 194 is coupled to the remainder of the back panel 188 by first and second central transverse surfaces 196 and 198. Upper and lower ends, i.e., longitudinally distal and proximal opposite ends, of the housing 2 are closed respectively by first and second outer transverse surfaces 202 and 204 included in the back panel 188. The first central and outer transverse surfaces 196, 202, respectively, are joined by a first rear surface 206. Second central and outer transverse surfaces 198, 204, respectively, are joined by a second rear surface 208.

Figure 5:
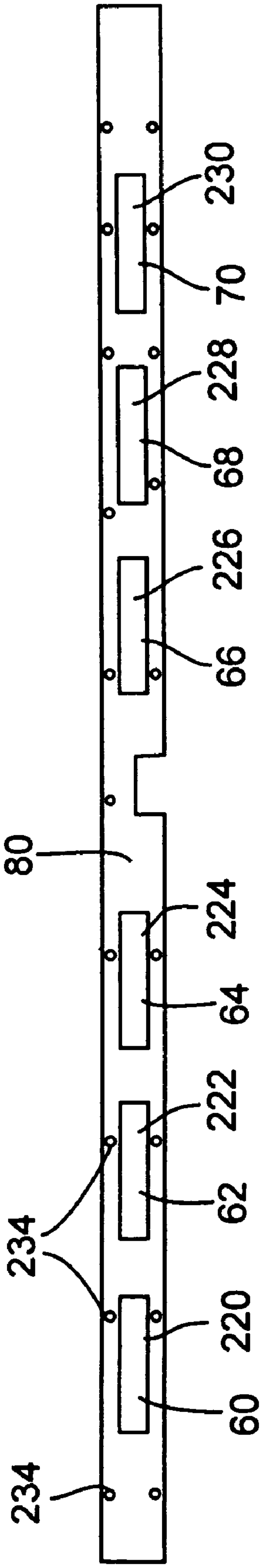
FIG. 5 is an elevation view of a side wall of the housing of FIG. 1 including fuse state indicators.

For rack mounting purposes, first and second longitudinally extending locator pins 210, 211, respectively extend longitudinally from the first central transverse surface 196. The first and second locator pins 210, 211, respectively, operate in conjunction with the mounting section 82 to operate as the detent 83. Third and fourth locator pins 213, 214, respectively, are provided and extend longitudinally from second outer transverse surface 204. The third and fourth locator pins may also function as described below to constrain the PDU 1 in a position. As shown in FIG. 5, the first side wall 80 includes first through sixth rectangular apertures 220, 222, 224, 226, 228, 230, which receive the first through sixth windows 60, 62, 64, 66, 68, 70, respectively. The windows 60-70 may be retained in any one of a number of manners, examples of which are described below. The first side panel 80 preferably has apertures 234 through which threaded fasteners may extend in order to thread into mating passages 235 (FIG. 4) in laterally disposed surfaces of the front panel 9 and the rear panel 188.

Figures 6, 7, 8:
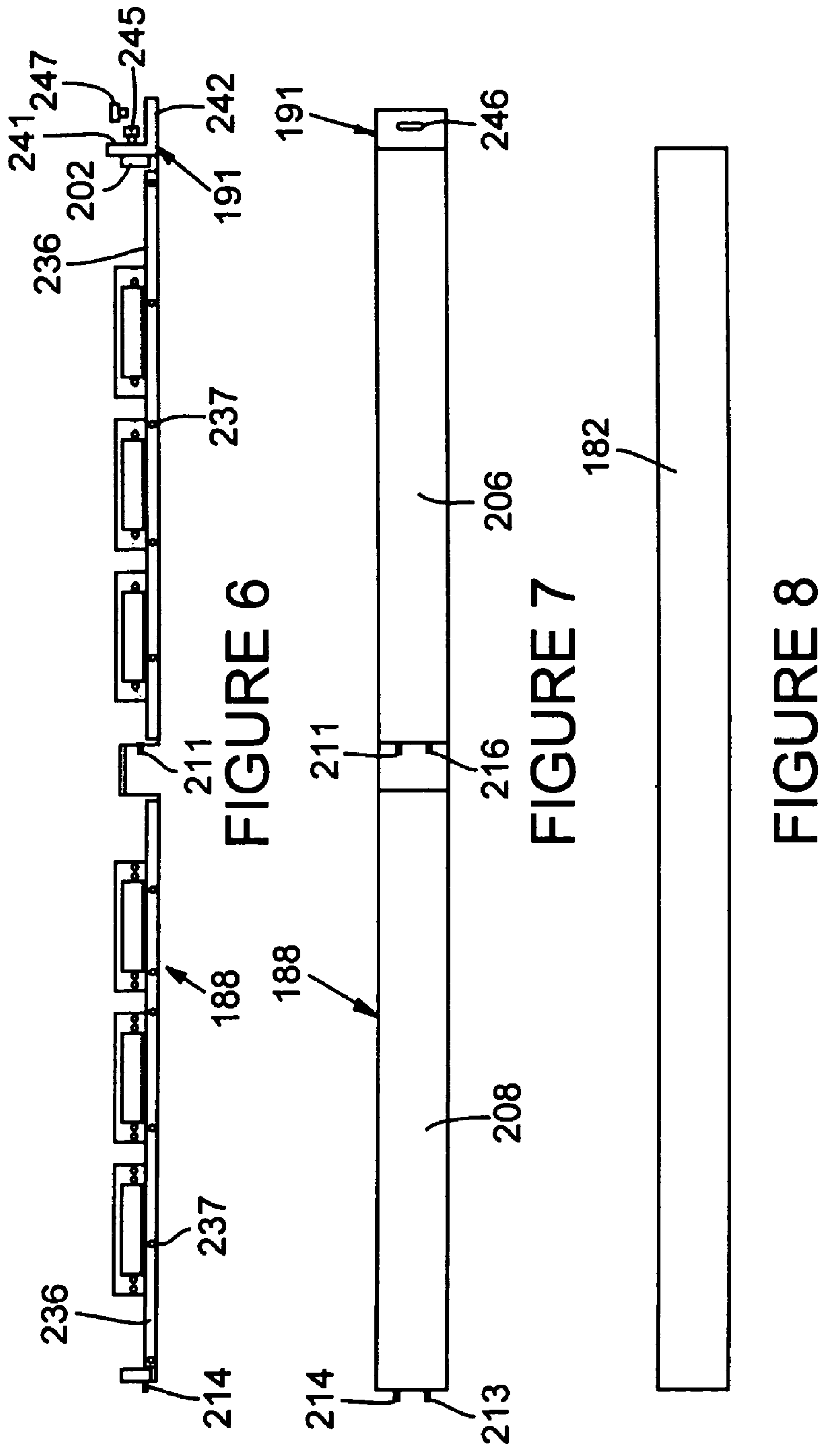
FIG. 6 is a side view of a back panel of the housing of FIG. 1 and a mounting bracket.
FIG. 7 is a plan view of a back panel of the housing of FIG. 1 and a mounting bracket.
FIG. 8 is an elevation view of the remaining side wall of the housing of FIG. 1.

As seen in FIG. 6, the back panel 188 includes a first flange 236 and a second flange (not shown) extending perpendicularly from transversely opposite edges thereof. The first and second flanges preferably include threaded apertures 237 in registration with the apertures 234 (FIG. 5) to receive fasteners. Other well-known means may be used for receiving fasteners such as self-fitting nuts. The second side panel 182 (FIG. 8) may be secured to the back panel 188 in the same manner.

The end mounting bracket 191 has first and second legs 241, 242, respectively, which are preferably perpendicular to each other. The first leg 241 is joined to the top surface 202 of the back panel 188 by fasteners 245. The second leg 242 has an aperture 246 which may receive a fastener 247 for mounting in a rack unit.

Figure 9:
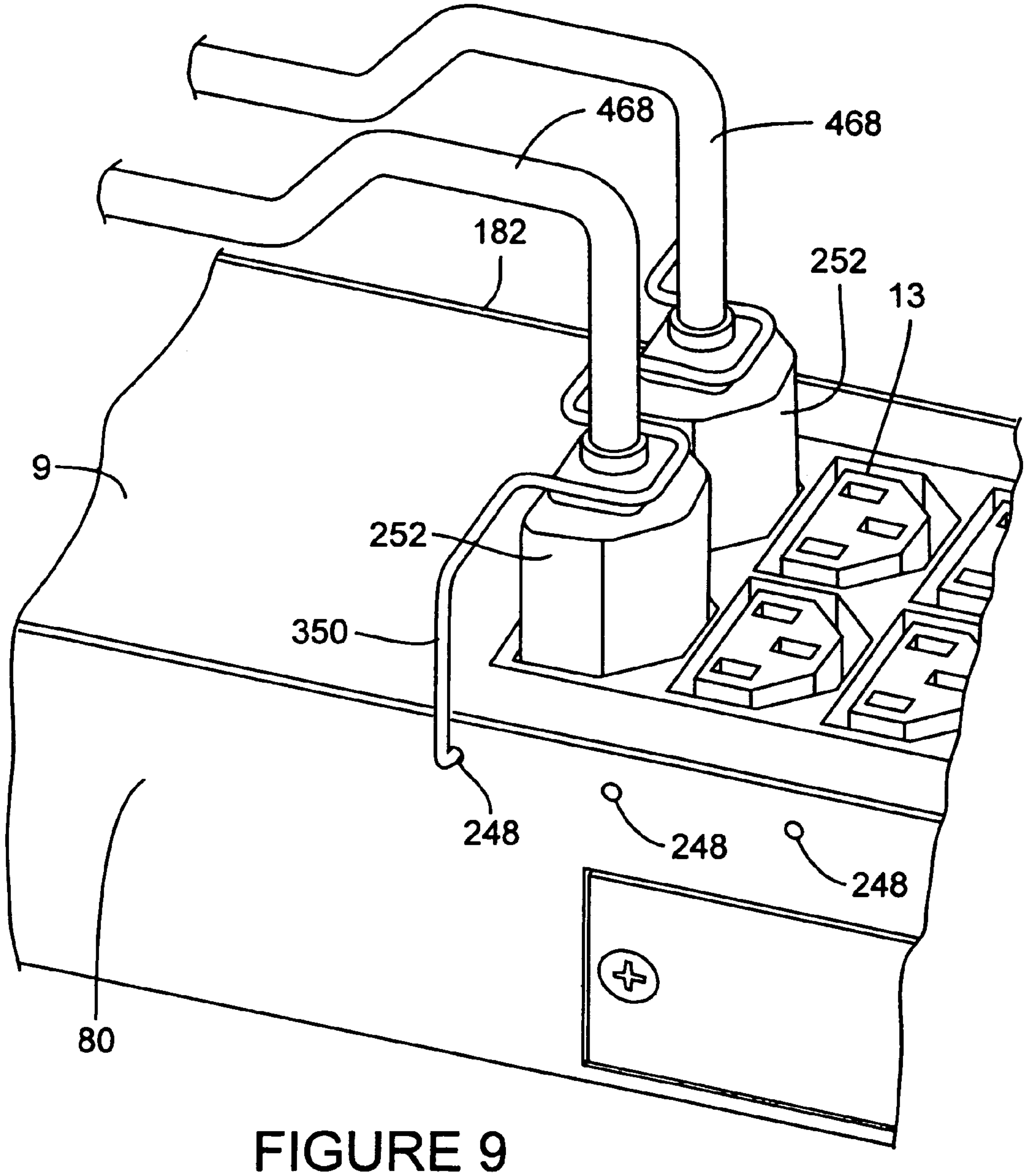
FIG. 9 is a partial detailed axonometric view of an embodiment including a device for holding power plugs in engagement with the apparatus of FIG. 1.

As seen in FIG. 9, in a further form, at a forward side of the first and second side walls 80 and 182, additional apertures 248 may be provided to receive opposite ends of plug retainers 250 to hold AC plugs 252 in engagement with receptacles 13. A plug retainer 350 is preferably a wire with sufficient stiffness to hold a plug 252 in place when opposite ends of that are secured in one aperture 248 in the first side wall 80 and a second aperture (not shown) in the second side wall 182. The wire should have sufficient flexibility to respond to manual force to be pushed onto or off of an end of the plug 252 remote from the front panel 9 and provide a press fit.

Figure 10:
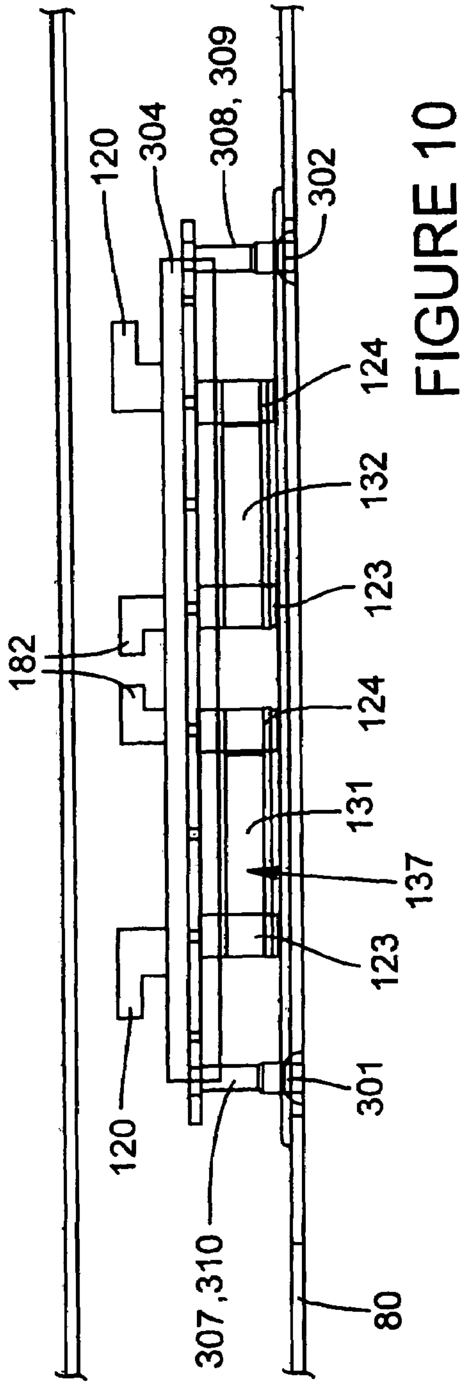
FIG. 10 is a partial plan view of a first form of one fuse assembly included in the apparatus of FIG. 1.
Figure 11:
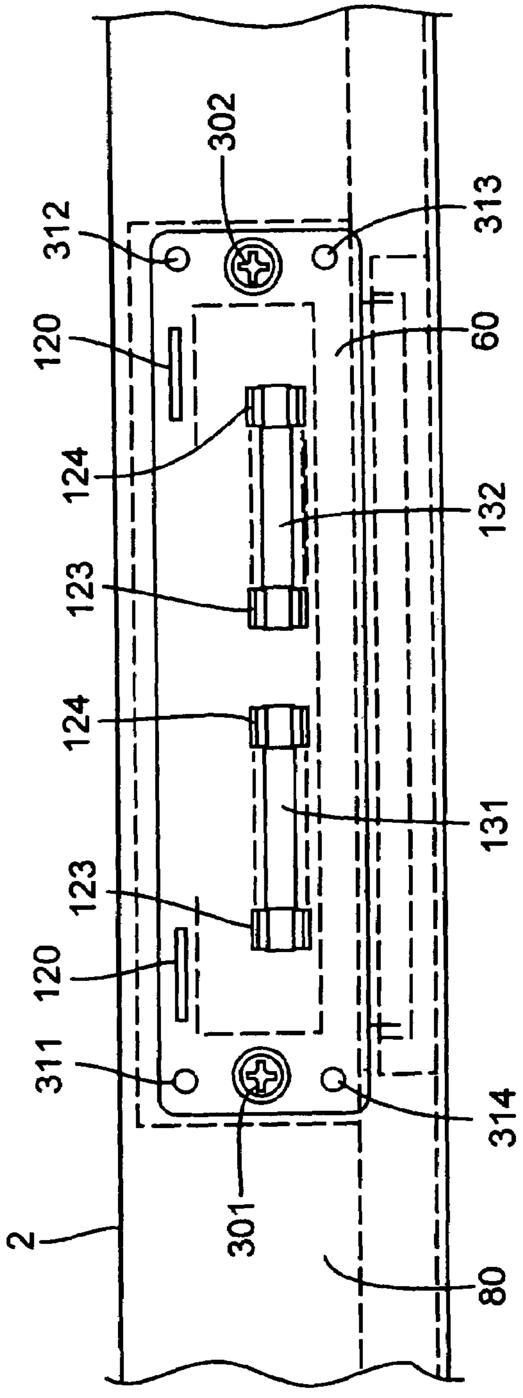
FIG. 11 is a partial elevation view of a first form of one fuse assembly included in the apparatus of FIG. 1.

With reference now to FIGS. 10 and 11, the first window 60 is exemplary of all of the first through sixth windows 60-70. Fuses 131 and 132 are located side by side longitudinally and are laterally adjacent the first window 60 within the interior confines of the housing 2. Each of the first and second fuses 131, 132 is connected between one of the pairs of first and second fuse mount terminals 123, 124. Each pair of first and second fuse mount terminals 123, 124 is connected in one of the lines 120.

A volume containing the fuses 131, 132 is referred to as a compartment 137. Compartments, e.g., 137, each have volumes in registration with the first through sixth windows 60-70 respectively. In the present embodiment, the compartment 137 is a volume which is accessible by removal of a window without disassembly of the housing 2. Inclusion of walls that isolate the compartment from the remainder of the interior volume of the housing 2 is optional. Consequently, the fuse-containing sections of the PDU 1 may be segregated from other areas within the housing 1. Therefore, a manufacturer could permit a user to open up only that portion of the PDU 1 necessary to reach one of the fuses, e.g., 131, 132 while not having to void a warranty for opening up the rest of the housing 2. Specific examples of ways of fastening the windows 60-70 are illustrated below.

The housing 2 may be constructed so that the windows 60-70 are removable with simple hand tools. The windows 60-70 may be dimensioned for easy access to fuses such as the first and second fuses 131 and 132. Easy access may include access by fingers of a user or by hand tools.

The pairs of first and second fuse mount terminals 123, 124 and first and second fuses 131,132 are mounted to a circuit board 304. First through sixth circuit boards, e.g., 304, are provided for inclusion in compartments, e.g., 137. The fuses 131, 132 are visible through the window 60. In the present embodiment, the portions of the first side panel 80 at longitudinal ends (left and right ends as viewed in FIGS. 9 and 10) are recessed so that the first window 60 can be received in the aperture 220 (FIG. 5) and be substantially flush with the first side panel 80. The first window 60 is retained to the first side wall 80 by first and second fasteners 301, 302, which may be screws. The circuit board 304 in the present example is mounted to the window 60 for convenience but could be mounted to the housing 2 if desired. At each corner of the circuit board 304, one of first through fourth standoffs 307 to 310 maintain the circuit board 304 at a preselected transverse displacement from the window 60. First through fourth standoff fasteners 311 to 314 pass through the window 60 and respective standoffs 307 to 310 and are retained in the circuit board 304.

Figure 12:
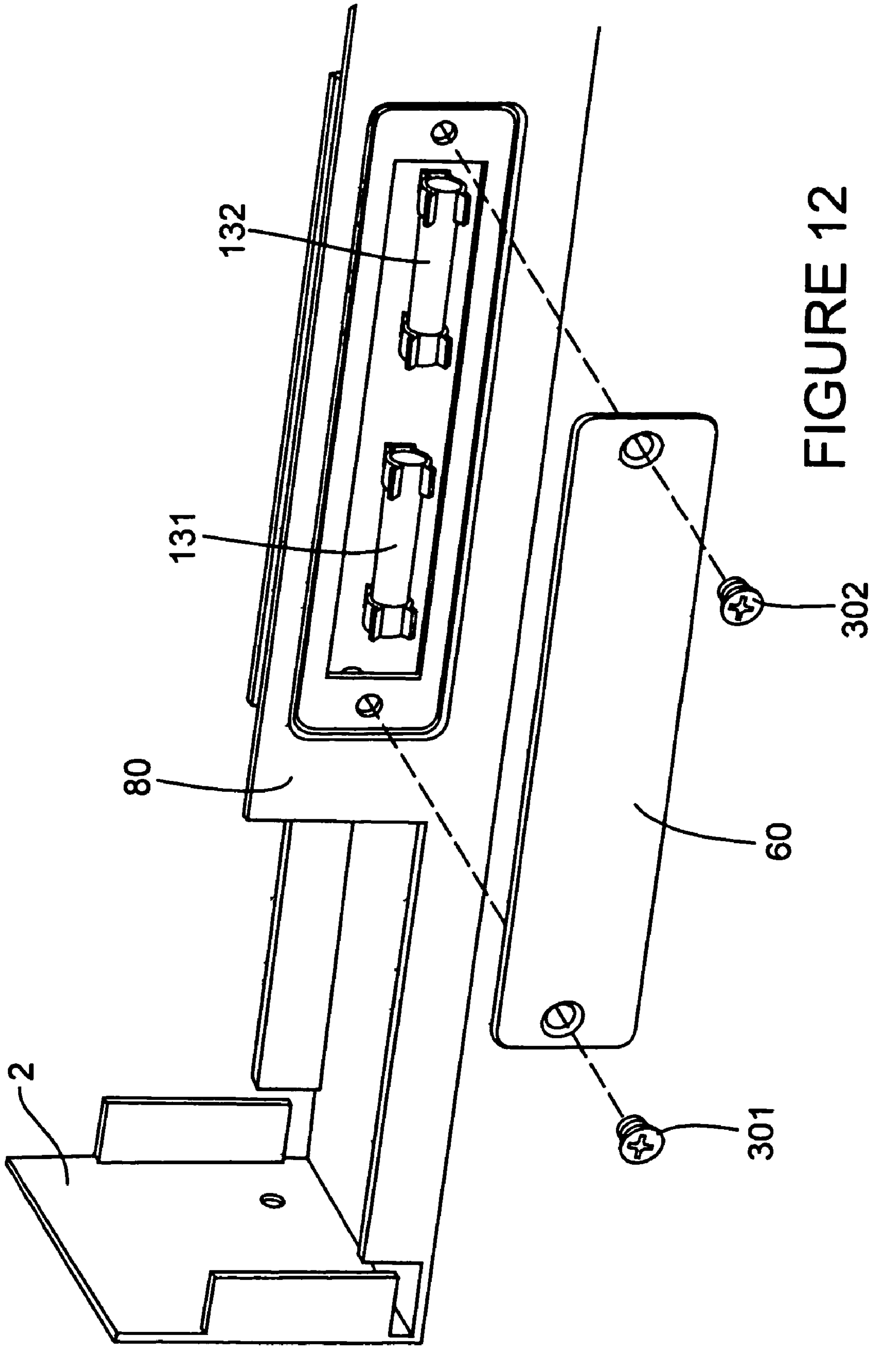
FIG. 12 is a partial detailed view similar to that of FIG. 11 illustrating another embodiment of a fuse assembly.
Figure 13:
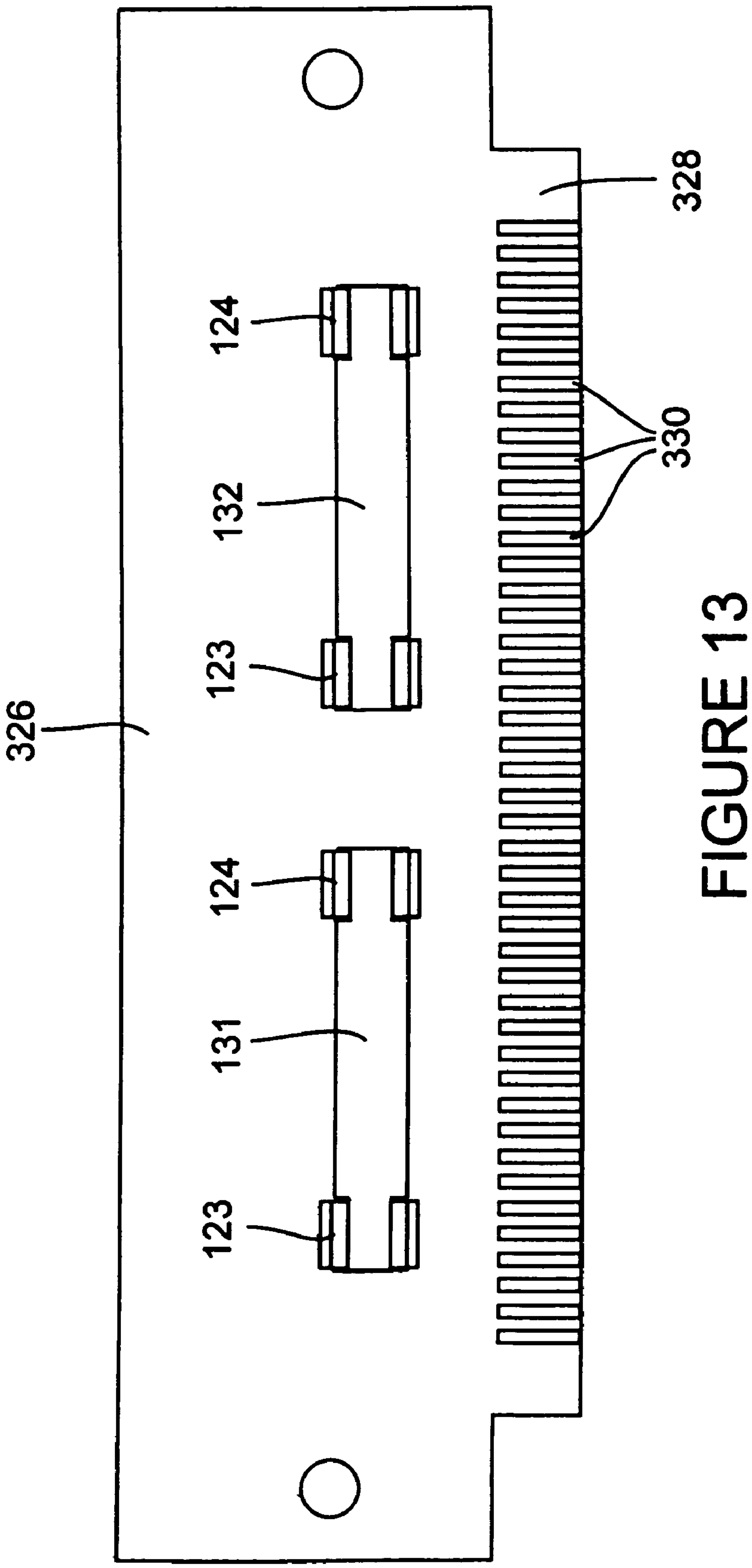
FIG. 13 is an elevation view of a removable fuse card.
Figure 14:
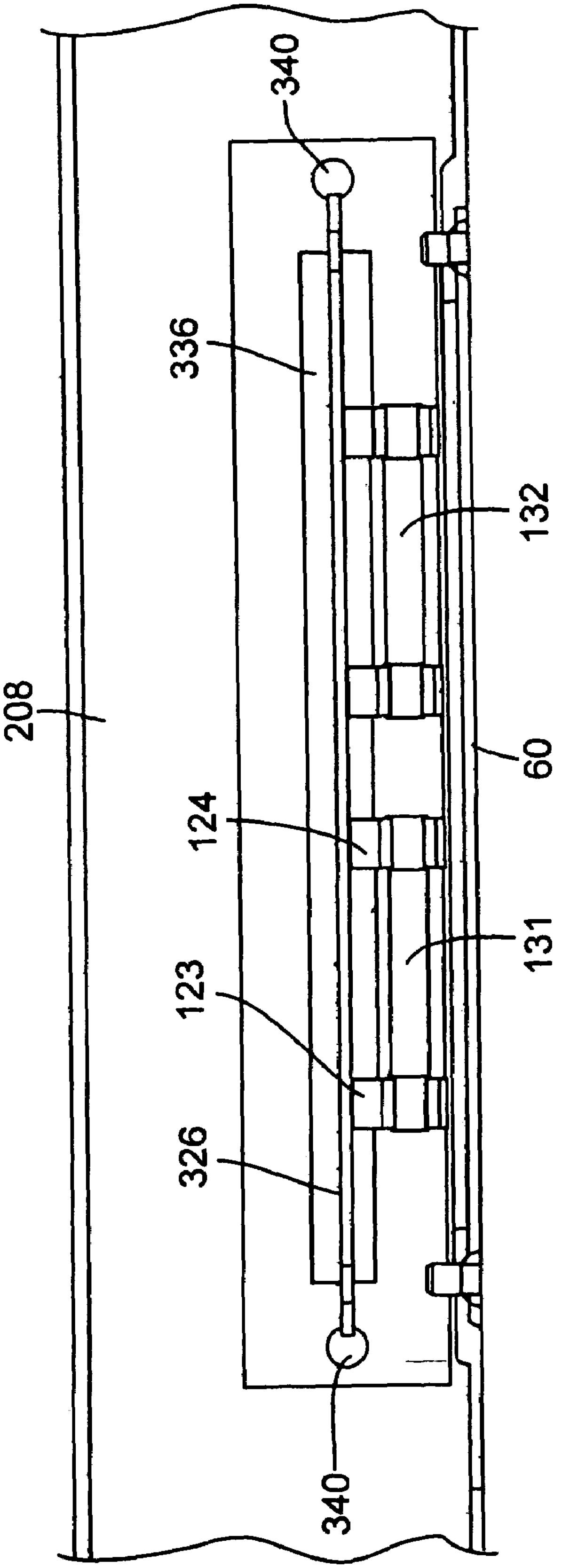
FIG. 14 is a plan view of the removable fuse card of FIG. 13 mounted within a housing such as shown in FIG. 12.

With reference to FIGS. 12-14, the window 60 is fastened to the first side wall 80 by the fasteners 301 and 302. The fuse card 326 includes a tab 328 having copper tab terminals 330. FIG. 14 is a plan view of the assembly of FIG. 12 with the fuse card 326 removed therefrom. The pairs of first and second fuse mounting terminals 123, 124 coupled to each fuse 131 and 132 are each coupled to tab terminals 330. The tab 328 is received in a conventional card connector 336 providing mechanical support for the fuse card 326 and providing the series connection of each of the fuses 131 and 132 in one of the lines 120. The tab terminals 330 and card connector 336 are wired in a well-known manner to provide the above-described series connections of the fuses 131 and 132 in series between the first supply terminal block 101 (FIG. 2) and the first and second receptacle banks 10 and 12 respectively. The card connector 336 is supported directly or indirectly to the housing 2. In the present example, for simplicity in illustration, the card connector 336 is supported to an inner side of the second rear surface 208 of the back panel 188 (FIG. 3) by fasteners 340. It may be desirable to support the connector 336 to the front panel 9 (FIG. 1) or first side panel 80 (FIG. 1).

Figure 15:
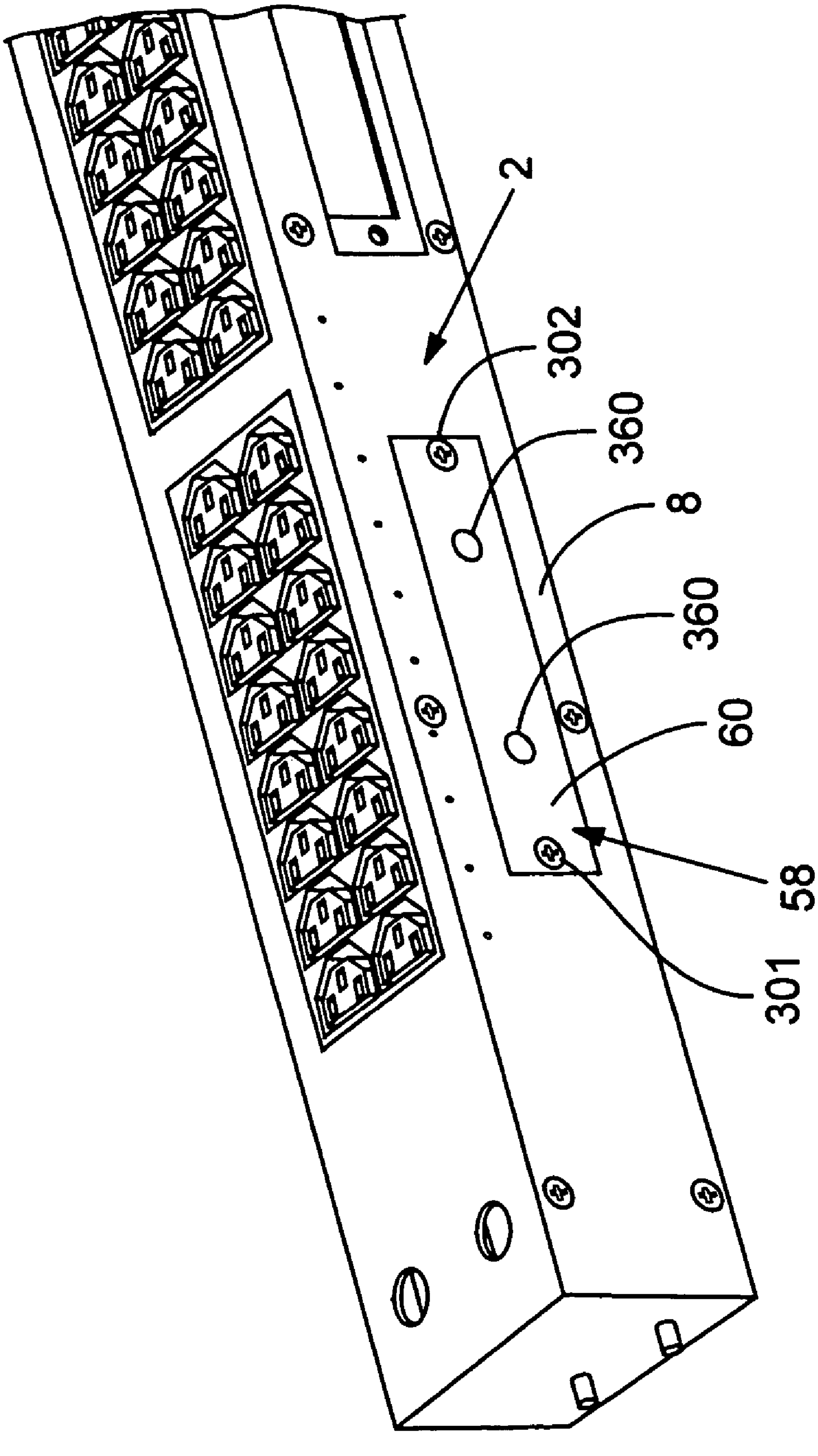
FIG. 15 is a partial detailed view of FIG. 1 illustrating yet another embodiment in which an element changes state to indicate fuse condition.
Figure 16:
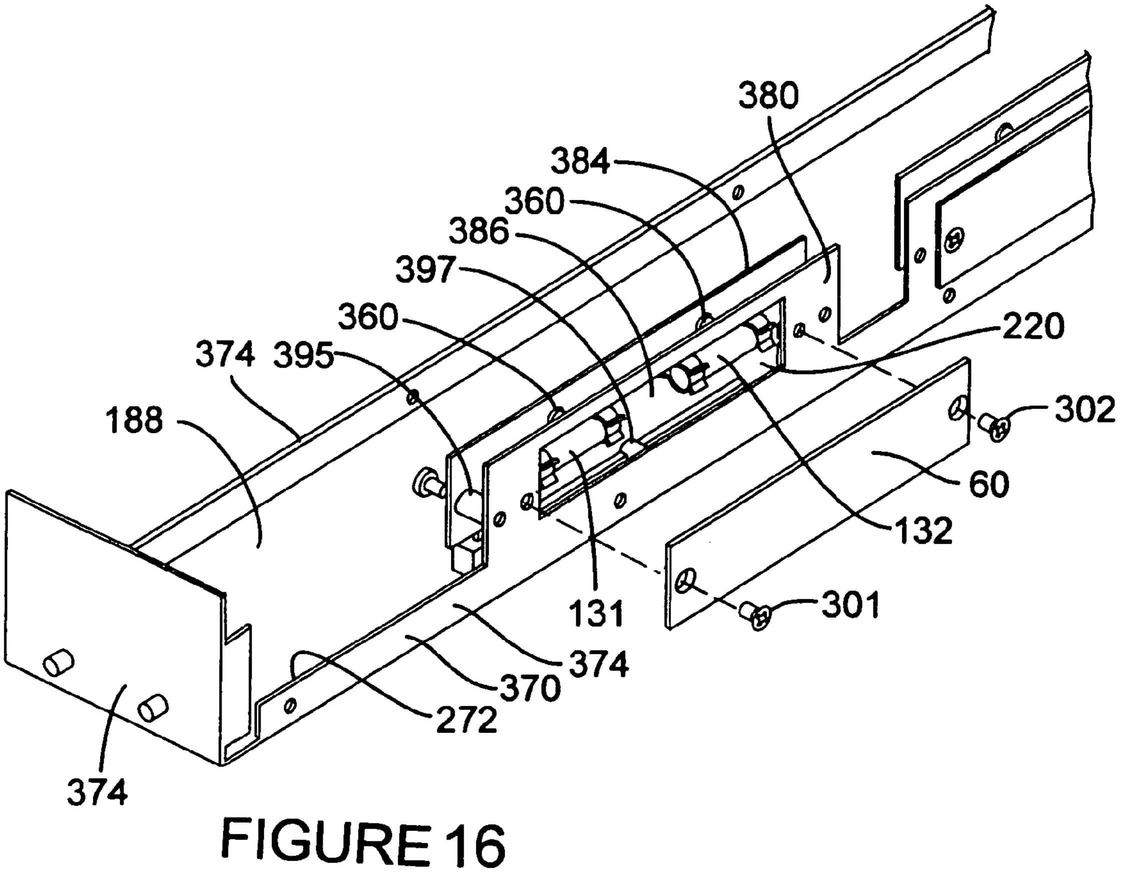
FIG. 16 is an exploded view of selected elements of the embodiment of FIG. 15.

FIG. 15 is a partial, detailed axonometric view of FIG. 1 illustrating yet another embodiment in which the fuse state indicator 58 is an indicator device whose state corresponds to whether the fuse is conductive or blown. FIG. 16 is an exploded view of selected elements of the embodiment of FIG. 15.

In the embodiment shown in FIGS. 15 and 16, the fuse state indicators 58 each include light emitting diodes (LEDs) 360 visible through the window 60. The embodiment of FIG. 15 includes an additional component for mounting the window 60 which may be used irrespective of which type of fuse state indicator is used. The additional component is a face plate 370 which has a back surface 372 in registration with the back panel 188 and perpendicular flanges 374 extending perpendicularly, i.e., transversely, from the lateral and longitudinal edges thereof. Additionally, a rectangular member 380 projects from the flange 374 in registration with each of the respective apertures 220. Each rectangular member 380 may have a greater longitudinal extent than the aperture 220 and window 60. The window 60 may be fastened to the rectangular member 380 with the fasteners 301 and 302. A circuit board 384 may be separately fastened to the first rectangular member 380 of the face plate 370. The rectangular member 380 has a central cutout 386 so that fuses 131 and 132 on the circuit board 384 are accessible therethrough for replacement.

Figure 17:
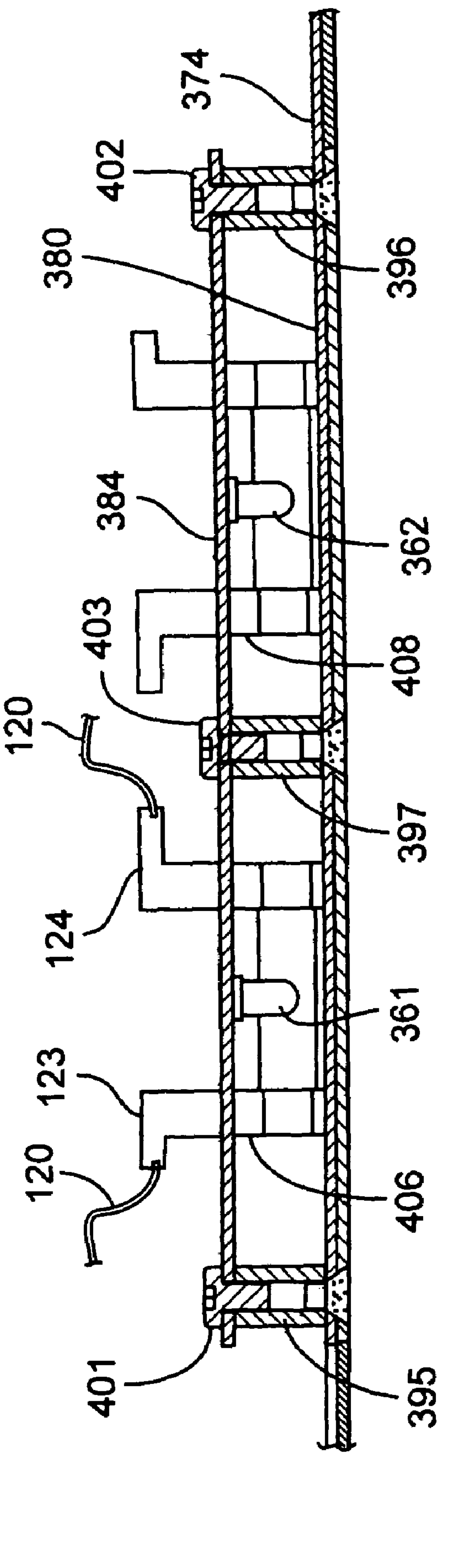
FIG. 17 is a plan view of the apparatus of FIG. 15.
Figure 18:
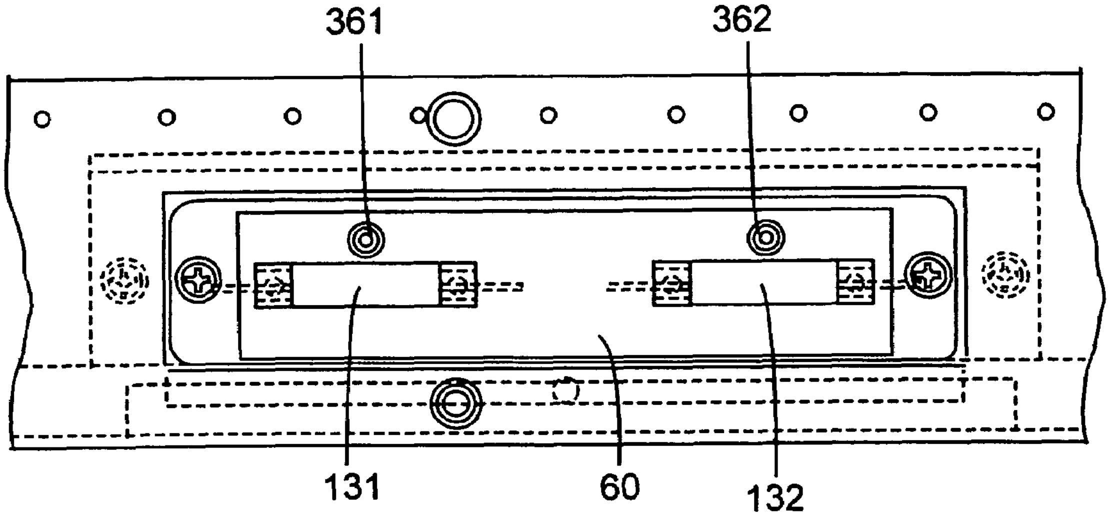
FIG. 18 is an elevation view of the apparatus of FIG. 15.

FIGS. 17 and 18 are a plan view and an elevation view, respectively, of the apparatus of the elements of FIGS. 15 and 16 as assembled. With reference to FIGS. 15-18, the fasteners 301 and 302 are received in nuts (not shown), which are on an opposite side of the face plate 374 from the window 60. Preferably, the nuts are adhered to the face plate 374. The circuit board 384 is displaced from the faceplate 374 by standoffs 395 and 396 on opposite longitudinal sides of the window 60 (opposite left and right sides as viewed in FIGS. 17 and 18) and a third faceplate standoff 397 longitudinally intermediate the faceplate standoffs 395 and 396 and laterally displaced therefrom. The faceplate standoffs 395 through 397 may be glued to the faceplate 374 or otherwise fastened thereto. First, second and third standoff screws 401, 402 and 403 may secure the circuit board 384 to the standoffs 395, 396 and 397, respectively. The fuses 131 and 132 are respectively received in first and second fuse cartridge holders 406 and 408, respectively. The first and second fuse cartridge holders 406 and 408 extend through the circuit board 384 to connect to separate pairs of first and second terminal lugs, e.g., terminal lugs 123, 124.

The indicator LEDs 361 and 362 are mounted adjacent the fuses 131 and 132 respectively. Each LED 361 or 362 is in the OFF state when its corresponding fuse is blown and in the ON state when the fuse is conducting. In order to provide this operation, the indicator LEDs 361 and 362 may be connected from the load side of the fuses 131 and 132, respectively, to the source side of the fuses 132 and 131, respectively, so as to be energized when the fuse is conducting and to be deenergized when the fuse circuit is open. The LEDs 361 and 362 are mounted in a conventional manner so the leads (not shown) extend from an opposite side of the circuit board 384 from which the LEDs 361 and 362 are visible for connection to circuitry further described below. Other connections could be provided to achieve this operation. Indicator elements other than LEDs could also be used.

Figure 19:
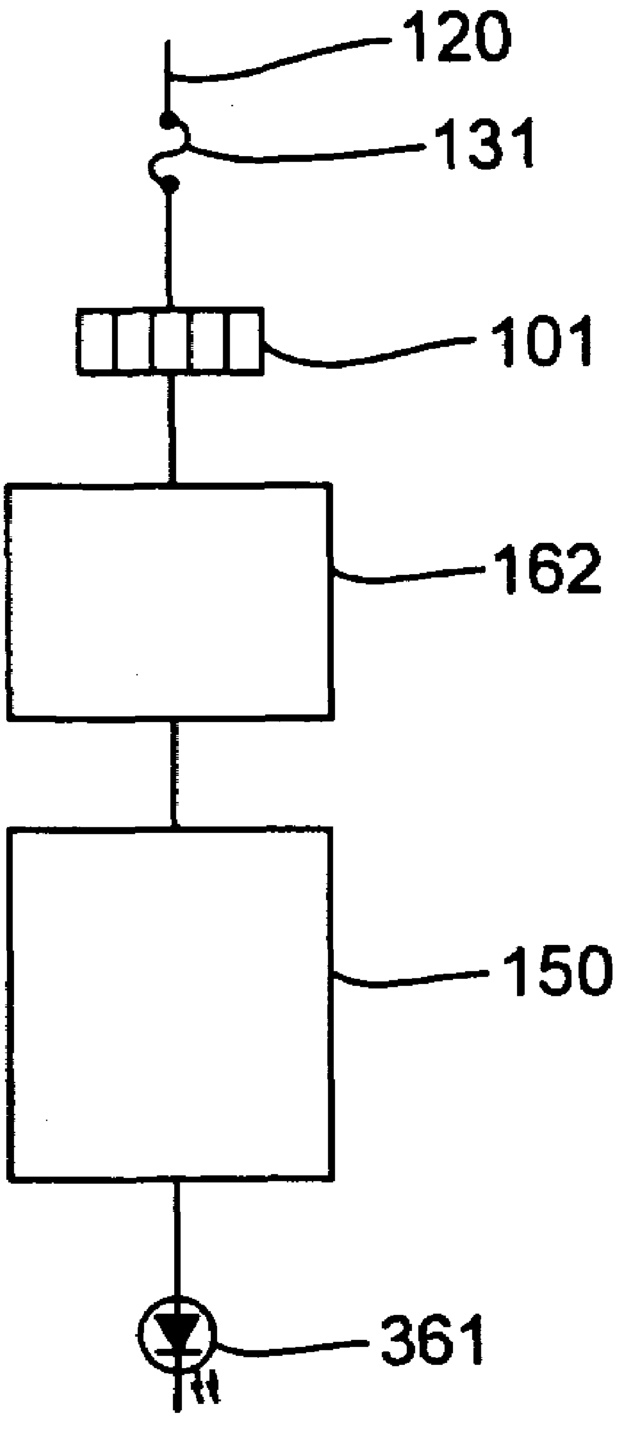
FIG. 19 is a schematic diagram of a fuse condition indication circuit that can be used in selected embodiments.

FIG. 19 is a schematic diagram of the fuse condition indication circuit that may be used in selected embodiments. In FIG. 19, the same reference numerals are used to denote elements corresponding to those in FIG. 2. The first and second fuses 131 and 132 (see above) are each connected to the first bank supply terminal block 101. The IT-DSP module 162 is connected to the first bank supply terminal block 101 to sense continuity in the power line 120. This sensing of an open circuit is done in the same manner as in the above-cited Dual-Feed Power Tower XL system. In the present embodiment, the IT-DSP module is used to sense whether each of the lines 120 including the fuse 131 are closed between the first and second outlet banks 10 or 12 (see above) and the first bank supply terminal block 101. If the circuit is open, the IT-DSP module 162 provides a signal indicative thereof to the control circuit 150. The control circuit 150 sends an activation signal to illuminate the LED 361 if the fuse 131 is blown or an activation signal to the LED 362 if the fuse 132 is blown. Otherwise, the LEDs 361 and 362 remain off. The state of the LEDs 361 and 362 is visible through the window 60.

FIG. 20 is a perspective view of the electrical apparatus 1 of FIG. 1 mounted in a rack. FIG. 21 is a partial detailed view of FIG. 20. FIG. 22 is a partial detailed view FIG. 20 illustrating the electrical apparatus I as viewed in the rack apparatus when facing the back panel 188 of the housing 2. The same reference numerals are used to denote elements appearing, for example, in FIGS. 1-9.

With reference now to FIGS. 20-22, the rack 430 is RETMA rack and includes a cabinet 432 closable on a rear side 440 by first and second shielded doors 434 and 435 which are pivoted to first and second opposite sides 436 and 437, respectively, of the rack 430. The first and second doors 434 and 435 meet at the center when closed at the rear side 440. Channel-shaped horizontally disposed first and second bracing members 445 and 446 are located at a vertical midpoint of the first and second sides 436 and 437, respectively, of the rack 430. The first and second bracing members 445 and 446 preferably define vertical cross sections having a rectangular envelope. The housing 2 will preferably be aligned with its longitudinal dimension in registration with the vertical dimension of the rack 430. The first and second bracing members 445 and 446 preferably have first and second horizontally extending support surfaces 438, 439, respectively, which may include flanges. The first and second support surfaces 438, 439 each have locating apertures 441. The locating apertures 441 may receive the locating pins 210 and 211. First and second vertically extending rack rails 448 and 449 are located adjacent the sides 436 and 437.

In the present embodiment, the first and second rack rails 448 and 449 are supported to the first and second horizontally disposed bracing members 445 and 446 and are further secured to first and second upper housing members 452 and 453 substantially parallel to the first and second bracing members 445 and 446 at the upper vertical extent of the rack 430. The first and second rack rails 448 and 449 are also further secured to first and second lower housing members 454 and 455, which are substantially parallel to the first and second bracing members 445 and 446, and disposed at the lower vertical extent of the rack 430. The first and second lower housing members 454 and 455 may each contain a surface having apertures (not shown) for receiving the locator pins 213 and 214 extending from the longitudinally proximal end of the housing 2.

Figure 23:
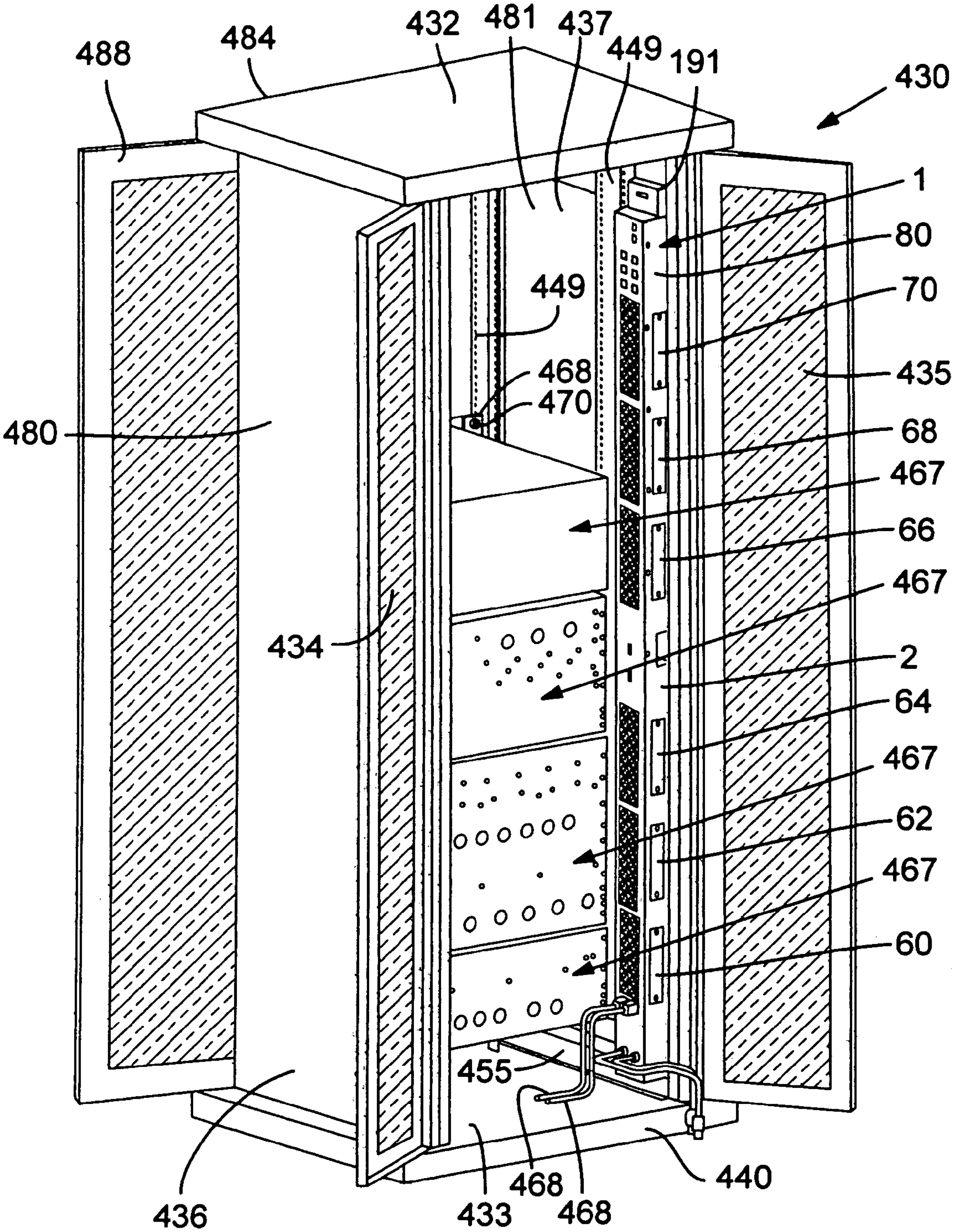
FIG. 23 is a perspective view of an embodiment in which a power distribution unit is mounted within the confines of a rack having doors providing access to the power distribution unit and other components mountable in the rack.

The rack 430 is a standard component, and the rails 448 and 449 when mounted as described are spaced form each other to support standard size rack mounted equipment units 467 powered by power cords 468 (FIG. 23). The first and second rack rails 448 and 449 have fastener-receiving openings 464. Commonly, the rack mounted units 467 will have rack fastener passages 468, such as notches or apertures. Rack equipment fasteners 470, such as screws secured by nuts, extend through the passages 468 to secure the various rack mounted units 467 to the first and second rack rails 448 and 449.

The rack fastener passages 468 are preferably spaced to accommodate standardized unit heights. Unit height is standardized in multiples, referred to as 1U, 2U, etc., of a standard height dimension U (1.75 inches).

In order to provide for convenient access for users of the rack 430 to plugs 252, the PDU 1 is placed between the first and second rack rails 448 and 449 and the back side 440. In the present example, the housing 2 is vertically disposed with the back panel 188 facing the second side 437. In order to better fit in the rack 430, the detent 83 cooperates with the second bracing member 446. The second bracing member 446 fits in the contour 82 (FIG. 1) of the rack mating section 81. First and second locating pins 211 and 212 extending vertically downwardly from the first inner lateral surface 196 (FIG. 3) are received in apertures 441 to locate the housing 2 on the second bracing member 446 adjacent the second rack rail 449. The second bracing member 446 provides vertical support to the housing 2. The pins 213 and 214 at the second outer lateral surface 204 of the housing 2 (FIG. 3) are received in the apertures 454 of one of the second lower housing member 455. The second lower housing member 455 may also share weight applied in the vertical direction from the housing 2. It is possible to change the spacing of the surfaces of the second bracing member 446 and second lower housing member 455 to vary distribution of the weight of the housing 2.

Normally both the second bracing member 446 and second lower housing member 455 will provide support. Alternatively, or in addition, the end mounting bracket 191 (FIG. 1) may be secured to the second upper housing member 453 by the fastener 247 (FIG. 6).

The housing 2 is mounted so that the windows 60-70 remain visible. Therefore, the fuses 131-136 can always be inspected to determine each of their states. Since the windows 60-70 remain accessible, they can be removed without removing the housing 2 from the rack 430 and without disassembly of the housing 2. Therefore, any downtime due to the need to replace a fuse is minimized.

FIG. 23 is a perspective illustration similar to FIG. 20 in which the same reference numerals are used to denote corresponding components. However, the rack 430 in FIG. 23 has first and second side walls 480 and 481, respectively, outside of rails 448 and 449. A front side 484 of the rack 430 may be closed by a first front door 488 and a second front door (not shown) respectively pivoted to sides 480 and 481. Similarly, a rear side 440 of the rack 430 may be closed by first and second rear doors 434 and 435 respectively pivoted to sides 480 and 481. Further rack mounted equipment units 467 are illustrated mounted to the first and second rack rails 448 and 449 (FIG. 20). Power cords 468 may be conveniently plugged in the housing 2.

In accordance with the above teachings, fuses are provided in a readily accessible position. The housing 2 of the PDU 1 is configured so that when it is assembled into another apparatus, the fuse covers, e.g., the windows 60, can be removed without having to remove the housing 2 from the other apparatus, such as adjacent electronic equipment in a rack. In the embodiments illustrated in FIGS. 20-23, the windows 60 are mounted in the side wall 80 (FIG. 1), and the housing 2 is mounted on the right side of rack 430 as seen in FIGS. 20 and 23. Alternatively, the windows 60-70 could be included in side wall 182 illustrated in FIG. 3. The windows 60-70 mounted in the side wall 182 would be unobstructed when mounted the housing 2 is mounted in a left side of the rack 430. The housing 2 may be constructed in either configuration.

Fused circuitry may be isolated from the fuses themselves so that a user may be permitted to open a fuse compartment without having to open a circuit enclosure, which might void a warranty.

Further, the state of the fuses may be inspected without having to remove fuse covers or open a fuse compartment. For example, a fuse may be inspected through a transparent window. Alternatively, a fuse state indicator element may be provided having first and second states each corresponding to a conductive or nonconductive state of the fuse. Different fuse-carrying structures are provided, each of which allows for simplicity and convenience in replacing fuses. Fingers or simple hand tools may be used. Indicators are provided which may interact with existing intelligent power control circuitry.

Alternatively, in some embodiments, circuit breaking structures other than fuses, such as conventional circuit breakers, can be used. Such circuit breaking structures can be mounted to a printed circuit board or fuse card within the side wall 182 of the housing 2 in the same or a similar manner as the fuse or fuses described above so that the circuit breaking structures can be readily observed or reset by a user without opening the housing 2.

In the preferred embodiment of FIG. 20, the housing 2 is readily mountable within the confines of a rack so that the fuse covers or windows are readily accessible. Consequently, down time resulting from inspecting or replacing fuses is minimized. When a communications server is down, saving even a few minutes in completing service is of great value to users. The construction of the detent allows a single service technician to have the PDU remain in place while fasteners are being inserted to secure the PDU to the rack.

Many modifications may be made in the specific teachings provided above to provide an electrical apparatus constructed in accordance with the present invention.

We claim:

1. An electronic equipment rack assembly comprising in combination:

an electronic equipment rack having multiple electronic equipment unit mounting sections, a front side, and a rear side opposite the front side; and a power distribution unit mounted within the electronic equipment rack intermediate the electronic equipment unit mounting sections and the rear side, the power distribution unit having (a) a power distribution unit housing mountable within the electronic equipment rack; (b) at least one power input penetrating the power distribution unit housing; (c) a plurality of power outputs, each of the power outputs electrically coupleable in power supplying communication with one or more electronic equipment units; (d) at least one fuse access passage penetrating the power distribution unit housing; (e) at least one movable fuse access passage cover mounted to the power distribution unit housing adjacent, and in communication with, an associated fuse access passage; (f) at least one outlet bank comprising at least two of the plurality of power outputs; and (g) at least one fuse assembly (1) mounted within the power distribution unit housing adjacent the at least one fuse access passage and (2) electrically coupled to the at least one outlet bank;

whereby the at least one fuse access passage and associated fuse access passage cover are aligned with the at least one associated fuse assembly so that the at least one fuse assembly is accessible through the at least one fuse access passage when the movable fuse access passage cover is positioned in an open position to provide such access.

2. The electronic equipment rack assembly of claim 1, wherein the at least one movable fuse access passage cover comprises an at least partially transparent window through which the at least one fuse assembly is viewable.

3. The electronic equipment rack assembly of claim 1, wherein the power distribution unit further comprises at least one fuse condition indicator associated with and in electrical communication with the at least one fuse assembly.

4. The electronic equipment rack assembly of claim 1, wherein the electronic equipment rack comprises a power distribution unit mounting area adjacent the electronic equipment unit mounting sections, the power distribution unit being mounted within the power distribution unit mounting area.

5. The electronic equipment rack assembly of claim 4, wherein the power distribution unit mounting area comprises a support arm, and the power distribution unit housing comprises a channel penetrating the housing, wherein the support arm is matingly engageable with the channel to mount the power distribution unit within the power distribution unit mounting area.

6. An electronic equipment rack assembly comprising in combination:

an electronic equipment rack having multiple electronic equipment unit mounting sections, a front portion, and a rear portion generally opposite the front portion, wherein the electronic equipment unit mounting sections extend from the front portion to a location intermediate the front portion and the rear portion; and a power distribution unit housing (a) a power distribution unit housing mountable within the electronic equipment rack; (b) at least one power input penetrating the power distribution unit housing; (c) a plurality of power outputs, each of the power outputs electrically coupleable in power supplying communication with one or more electronic equipment units; (d) at least one fuse access passage penetrating the power distribution unit housing; (e) at least one movable fuse access passage cover mounted to the power distribution unit housing adjacent, and in communication with, an associated fuse access passage; (f) at least one outlet bank comprising at least two of the plurality of power outputs; and (g) at least one fuse assembly (1) mounted within the power distribution unit housing adjacent the at least one fuse access passage and (2) electrically coupled to the at least one outlet bank, wherein the power distribution unit housing portion is disposed within the rear portion;

whereby the at least one fuse access passage and associated fuse access passage cover are aligned with the at least one associated fuse assembly so that the at least one fuse assembly is accessible through the at least one fuse access passage when the movable fuse access passage cover is positioned in an open position to provide such access.

7. An electronic equipment rack assembly comprising in combination:

an electronic equipment rack having multiple electronic equipment unit mounting sections, a front portion and a rear portion generally opposite the front portion; and a power distribution unit having (a) a power distribution unit housing mountable within the electronic equipment rack; (b) at least one rower input penetrating the power distribution unit housing; (c) a plurality of power outputs, each of the power outputs electrically coupleable in power supplying communication with one or more electronic equipment units; (d) at least one fuse access passage penetrating the power distribution unit housing; (e) at least one movable fuse access passage cover mounted to the power distribution unit housing adjacent, and in communication with, an associated fuse access passage; (f) at least one outlet bank comprising at least two of the plurality of power outputs; and (g) at least one fuse assembly (1) mounted within the power distribution unit housing adjacent the at least one fuse access passage and (2) electrically coupled to the at least one outlet bank, wherein the power distribution unit housing is mounted within the rear portion of the rack such that the at least one fuse assembly is accessible from the rear portion of the rack;

whereby the at least one fuse access passage and associated fuse access passage cover are aligned with the at least one associated fuse assembly so that the at least one fuse assembly is accessible through the at least one fuse access passage when the movable fuse access passage cover is positioned in an open position to provide such access.

8. The electronic equipment rack assembly of claim 2, wherein the electronic equipment rack comprises a front portion and a rear portion, and wherein the power distribution unit housing is mounted within the rear portion of the rack such that the at least one fuse assembly is viewable through the at least partially transparent window from the rear portion of the rack.

9. The electronic equipment rack assembly of claim 1, wherein the at least one movable cover is adjacent and facing the rear side of the electronic equipment rack.

10. The electronic equipment rack assembly of claim 1, wherein:

the at least one fuse access passage comprises a plurality of fuse access passages;

the at least one movable fuse access passage cover comprises a plurality of removable fuse access passage covers, each mountable to the housing to cover at least a portion of a respective one of the plurality of fuse access passages;

the at least one outlet bank comprises a plurality of outlet banks; and the at least one fuse assembly comprises a plurality of fuse assemblies mounted within the housing adjacent respective ones of the plurality of fuse access passages, with each fuse assembly being electrically coupled to at least one of the plurality of outlet banks;

wherein each of the plurality of fuse access passages is aligned with a respective one of the plurality of fuse assemblies.

11. An electronic equipment rack assembly of the type useable to receive a power input and to provide a plurality of outputs for rack mounted components, the electronic equipment rack assembly comprising in combination:

an electronic equipment rack providing an electronic component mounting area;

and a power distribution unit comprising a housing section mounted within the electronic equipment rack; a plurality of phase banks of outputs with each said phase bank coupled to the power input; and a plurality of fuse assemblies mounted within the housing section with each said fuse assembly connected to a corresponding phase bank, said housing having at least one fuse passage in registration with said at least one fuse assembly, each said fuse passage having a removable cover mounted to the housing section.

12. The electronic equipment rack assembly of claim 11, wherein the electronic equipment rack includes a door assembly on at least one side of the rack, and wherein the power distribution unit is mounted in the interior of the electronic equipment rack intermediate the door assembly and the electronic component mounting area of the electronic equipment rack.

13. The electronic equipment rack assembly of claim 12, wherein the removable cover mounted to the housing section is adjacent and facing the door assembly.

14. A method of supplying power to one or more electronic components each having at least one power input connector and being mounted within an electronic equipment rack, the electronic equipment rack having a front side, a rear side opposite the front side, and capacity for mounting a plurality of electronic components to the electronic equipment rack, the method comprising in combination:

with a power distribution unit comprising a housing, at least one power input penetrating the housing, a plurality of power outputs penetrating the housing, at least one fuse access passage penetrating the housing, and a movable fuse access passage cover mounted over a substantial portion of the at least one fuse access passage in the housing, mounting the power distribution unit housing intermediate the one or more electronic components and the rear side of the electronic equipment rack; and electrically coupling a power input connector of at least one of the electronic components to one of the plurality of power outputs of the power distribution unit.

15. The method of claim 14, wherein the movable cover comprises an at least semi-transparent window, the method further comprising visually inspecting a fuse mounted within the power distribution unit housing via the at least semi-transparent window.

16. The method of claim 14, wherein the power distribution unit comprises at least one fuse state indicator, the method further comprising visually indicating the status of a fuse electrically coupled to at least one of the power outputs via the at least one fuse state indicator.

17. A method of supplying power to one or more electronic components each having at least one power input connector and being mounted within an electronic equipment rack having capacity for mounting a plurality of electronic components to the electronic equipment rack, the method comprising in combination:

with a power distribution unit comprising a housing, at least one power input penetrating the housing, a plurality of power outputs penetrating the housing, at least one fuse access passage penetrating the housing. a movable fuse access passage cover mounted over a substantial portion of the at least one fuse access passage in the housing, and a fuse mounted within the power distribution unit housing adjacent the at least one fuse passage, mounting the power distribution unit housing to the electronic equipment rack;

electrically coupling a power input connector of at least one of the electronic components to one of the plurality of power outputs of the power distribution unit; and removing the cover and accessing the fuse via the fuse access passage.

18. A method of supplying power to one or more electronic components each having at least one power input connector and being mounted within an electronic equipment rack having capacity for mounting a plurality of electronic components to the electronic equipment rack, the method comprising in combination:

with a power distribution unit comprising a housing, at least one power input penetrating the housing, a plurality of power outputs penetrating the housing, at least one fuse access passage penetrating the housing, and a movable fuse access passage cover mounted over a substantial portion of the at least one fuse access passage in the housing, wherein the plurality of power outputs are disposed on a front wall of the power distribution unit housing and the at least one fuse access passage penetrates a side wall of the power distribution unit housing generally transverse to the front wall, mounting the power distribution unit housing to the electronic equipment rack, wherein mounting the power distribution unit comprises mounting the power distribution unit within the electronic equipment rack such that the front wall is transverse to the rear side of the rack and said side wall faces the rear side of the rack; and electrically coupling a power input connector of at least one of the electronic components to one of the plurality of power outputs of the power distribution unit.

19. A power distribution unit comprising in combination:

an elongated power distribution unit housing;

at least one power input penetrating the power distribution unit housing;

a plurality of power outputs penetrating the power distribution unit housing;

at least one circuit breaking element access passage penetrating the power distribution unit housing;

at least one outlet bank comprising at least two of the plurality of power outputs;

a communication port;

a control circuit coupled to the at least one outlet bank and the communication port;

at least one circuit breaking element assembly (i) mounted within the power distribution unit housing adjacent the at least one circuit breaking element access passage and (ii) being electrically coupled to the at least one outlet bank; and means for movably covering at least a portion of the at least one circuit breaking access passage.

20. A power distribution unit comprising in combination:

an elongated power distribution unit housing;

at least one power input penetrating the power distribution unit housing;

a plurality of power outputs penetrating the power distribution unit housing;

at least one circuit breaking element access passage penetrating the power distribution unit housing;

at least one outlet bank comprising at least two of the plurality of power outputs;

a communication port;

a control circuit coupled to the at least one outlet bank and the communication port; and means for breaking a circuit (i) mounted within the power distribution unit housing adjacent the at least one circuit breaking element access passage and (ii) being electrically coupled within a circuit power line in power supplying communication with the at least one outlet bank; and means for movably covering the circuit breaking means.

21. A power distribution unit comprising in combination:

an elongated power distribution unit housing mountable to an electronic equipment rack housing;

at least one power input penetrating the power distribution unit housing;

a plurality of power outputs penetrating the power distribution unit housing;

a communication port;

a control circuit coupled to the plurality of power outputs and the communication port;

at least one circuit protection assembly mounted at least partially within the power distribution unit housing and being electrically coupled to at least one of the plurality of power outputs; and at least one circuit protection assembly passage penetrating the power distribution unit housing, the at least one circuit protection assembly passage being in registration with the at least one circuit protection assembly.

22. The power distribution unit of claim 21, wherein the at least one circuit protection assembly comprises at least one circuit protection element accessible via the at least one circuit protection assembly passage.

23. The power distribution unit of claim 22, wherein the at least one circuit protection element comprises at least a portion of a circuit breaker.

24. The power distribution unit of claim 23, wherein the at least one circuit protection assembly comprises a circuit breaker indicator in communication with the circuit breaker.

25. The power distribution unit of claim 22, wherein the at least one circuit protection element comprises a fuse.

26. An electronic equipment rack assembly comprising in combination:

an electronic equipment rack having multiple electronic equipment unit mounting sections, a front side, and a rear side opposite the front side; and a power distribution unit mounted within the electronic equipment rack intermediate the electronic equipment unit mounting sections and the rear side, the power distribution unit comprising (a) a power distribution unit housing mountable within the electronic equipment rack; (b) at least one power input penetrating the power distribution unit housing; (c) a plurality of power outputs, each of the power outputs electrically coupleable in power supplying communication with one or more electronic equipment units; (d) at least one outlet bank comprising at least two of the plurality of power outputs; (e) at least one circuit protection access passage penetrating the power distribution unit housing; and (f) at least one circuit protection assembly mounted at least partially within the power distribution unit in registration with the at least one circuit protection access passage and electrically coupled to the at least one outlet bank.

27. The electronic equipment rack assembly of claim 26, wherein the at least one circuit protection assembly is mounted at least partially within the at least one circuit protection access passage.

28. The electronic equipment rack assembly of claim 27, wherein the least one circuit protection assembly comprises a circuit breaker.

29. The electronic equipment rack assembly of claim 26, wherein the at least one circuit protection assembly comprises a circuit breaker.

30. The electronic equipment rack assembly of claim 26, wherein the at least one circuit protection assembly comprises a fuse.

31. A power distribution unit of the type having at least one power input and a plurality of power outputs, each of the power outputs connectable to associated electronic equipment, the power distribution unit comprising in combination:

a power distribution unit housing;

a plurality of banks of power outputs displaced along the power distribution housing, each of the banks of power outputs comprising at least two of the plurality of power outputs;

a plurality of circuit protection assemblies, each said circuit protection assemblies connected to at least one of said banks of power outputs and mounted at least partially within and adjacent a wall of said power distribution unit housing; and a plurality of circuit protection access passages penetrating the power distribution unit housing, each of said circuit protection access passages being adjacent and in registration with at least one of said circuit protection assemblies.

32. The power distribution unit of claim 31, wherein at least one of the plurality of circuit protection assemblies comprises at least one circuit breaker.

* * * * *

UNITED STATES PATENT AND TRADEMARK OFFICE

CERTIFICATE OF CORRECTION

PATENT NO. : 7,567,430 B2
APPLICATION NO. : 11/529960
DATED : July 28, 2009
INVENTOR(S) : Ewing et al.

It is certified that error appears in the above-identified patent and that said Letters Patent is hereby corrected as shown below:

IN THE CLAIMS

In column 15, line 62, in claim 7, delete “rower” and insert -- power --, therefor.

In column 20, line 9, in claim 28, delete “the least” and insert -- the at least --, therefor.

Signed and Sealed this
Sixteenth Day of February, 2016

Michelle K. Lee
*Director of the United States Patent and Trademark Office*